United States Patent
Drakopoulos et al.

(10) Patent No.: US 6,480,299 B1
(45) Date of Patent: Nov. 12, 2002

(54) COLOR PRINTER CHARACTERIZATION USING OPTIMIZATION THEORY AND NEURAL NETWORKS

(75) Inventors: Paul Apostolos Drakopoulos, Boulder; Ganesh Subbarayan, Louisville, both of CO (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/199,626

(22) Filed: Nov. 25, 1998

Related U.S. Application Data

(60) Provisional application No. 60/066,844, filed on Nov. 25, 1997.

(51) Int. Cl.[7] ................................................. G06F 3/12
(52) U.S. Cl. ........................... 358/1.9; 358/1.1; 358/1.5
(58) Field of Search ........................... 358/1.1, 1.5, 1.6, 358/1.12, 1.13, 1.14, 1.15, 1.16, 1.9

(56) References Cited

U.S. PATENT DOCUMENTS 5,285,297 A   2/1994   Rose et al. .................. 358/518

OTHER PUBLICATIONS

James M. Kasson and Wil Plouffe; An Analysis of Selected Computer Interchange Color Spaces; *ACM Transactions on Graphics;* Oct. 1992; pp. 373–405; vol. 11, No. 4; San Jose, CA.

William B. Cowan; An Inexpensive Scheme For Calibration Of A Colour Monitor In Terms Of CIE Standard Coordinates; *Computer Graphics;* Jul., 1983; pp. 315–321; vol. 17, No. 3; Ottawa, Ontario, Canada.

William B. Cowan; CIE Calibration of Video Monitors; Technical Report, Division of Physics, National Research Council of Canada, 1987; pp. 1–51; Ottawa, Ontario, Canada.

Roy S. Berns; Methods for Characterizing CRT Displays; *Displays;* 1996; pp. 173–182; vol. 16 No. 4.

Maureen C. Stone, William B. Cowan and John C. Beatty; Color Gamut Mapping and the Printing of Digital Color Images; *ACM Transactions on Graphics;* Oct. 1988; vol. 7, No. 4; pp. 249–292.

(List continued on next page.)

*Primary Examiner*—Mark Wallerson
(74) *Attorney, Agent, or Firm*—Crowe & Dunlevy

(57) ABSTRACT

A color management method/apparatus generates image color matching and International Color Consortium (ICC) color printer profiles using a reduced number of color patch measurements. Color printer characterization, and the generation of ICC profiles usually require a large number of measured data points or color patches and complex interpolation techniques. This invention provides an optimization method/apparatus for performing LAB to CMYK color space conversion, gamut mapping, and gray component replacement. A gamut trained network architecture performs LAB to CMYK color space conversion to generate a color profile lookup table for a color printer, or alternatively, to directly control the color printer in accordance with the a plurality of color patches that accurately. represent the gamut of the color printer. More specifically, a feed forward neural network is trained using an ANSI/IT-8 basic data set consisting of 182 data points or color patches, or using a lesser number of data points such as 150 or 101 data points when redundant data points within linear regions of the 182 data point set are removed. A 5-to-7 neuron neural network architecture is preferred to perform the LAB to CMYK color space conversion as the profile lookup table is built, or as the printer is directly controlled. For each CMYK signal, an ink optimization criteria is applied, to thereby control ink parameters such as the total quantity of ink in each CMYK ink printed pixel, and/or to control the total quantity of black ink in each CMYK ink printed pixel.

53 Claims, 22 Drawing Sheets

OTHER PUBLICATIONS

R. S. Gentile, E. Walowit and J.P. Allebach; A Comparison of Techniques for Color Gamut Mismatch Compenstaion; *Journal of Imaging Technology;* Oct., 1990; pp. 176–181; vol. 16 No. 5.

Fritz Ebner and Mark D. Fairchild; Gamut Mapping from Below: Finding Minimum Perceptual Distances for Colors Outside the Gamut Volume; *Color Research and Application;* 1997; pp. 402–413; vol. 22 No. 6; John Wiley & Sons, Inc.

Gustav J. Braun and Mark D. Fairchild; General–Purpose Gamut–Mapping Algorithms: Evaluation of Contrast–Preserving Rescaling Functions for Color Gamut Mapping; *Journal of Imaging Science and Technology;* Jul./Aug., 2000; pp. 343–350; vol. 44 No. 4.

Jan Morovic and M. Ronnier Luo; The Fundamentals of Gamut Mapping: A Survey; *Journal of Imaging Science and Technology;* May/Jun., 2001; pp. 283–290; vol. 45 No. 3; UK.

Henry R. Kang; Printer–Related Color Processing Techniques; *Color Hard Copy and Graphic Arts IV;* 1995; pp. 410–419; vol. 2413; SPIE.

Hans E. J. Neugebauer; Die theoretischen Grundlagen des Mehrfarbenbuchdrucks; *Zietschrift für wissenchaftliche Photographie Photophysik and Photochemie;* Apr., 1937; pp. 73–89; vol. 36 No. 4; Germany.

J. A. C. Yule and W. J. Neilsen; The Penetration of Light Into Paper and Its Effect on Halftone Reproduction; *Proceedings of the Technical Association of the Graphic Arts;* TAGA; 1951; pp. 65–76.

F.R. Clapper and J. A. C. Yule; The Effect of Multiple Internal Reflections on the Densities of Half–tone Prints on Paper; *Journal of the Optical Society of America;* Jul., 1953; pp. 600–603; vol. 43 No. 7.

F. R. Clapper and J. A. C. Yule; Reproduction of Color With Halftone Images; *Proceedings of the Technical Association of the Graphic Arts;* TAGA; 1955; pp. 1–14.

Beer; Bestimmung der Absorption des rothen Lichts in farbigen Flüssigkeiten; *Ann. Phys. Chem.;* 1852; pp. 78–88; vol. 86 No. 2; Germany.

James M. Kasson, Sigfredo I. Nin, Wil Plouffe and James L. Hafner; Performing Color Space Conversions with Three–Dimensional Linear Interpolation; *Journal of Electronic Imaging;* Jul., 1995; pp. 226–250; vol. 4 No. 3.

Lucien Xu and Richard Holub; Color Spaces for Image Representation and Image Processing; *Proceedings of the Technical Association of the Graphic Arts;* 1992; pp. 114–137; vol. 45 No. 1.

James Gordon, Richard Holub and Robert Poe; On the Rendition of Unprintable Colors; *Proceedings of the Technical Association of the Graphic Arts;* 1987; pp. 186–195; vol. 39 No. 1.

Kazuo Sayanagi; Black Printer, UCR and UCA–Gray Component Replacement–; *Proceedings of the Technical Association of the Graphic Arts;* TAGA; 1987; pp. 711–724.

American Association of Advertising Agencies; *Recommended Specifications Web Offset Publications (SWOP);* 1988; p. 18; American Business Press.

Tony Johnson; Methods for Characterizing Colour Printers; *Displays;* 1996; pp. 193–202; vol. 16 No. 4.; UK.

Sigfredo I. Nin, James M. Kasson and Wil Plouffe; Printing Cielab Images on a CMYK Printer Using Tri–Linear Interpolation; *Color Hard Copy and Graphic Arts;* 1992; pp. 316–324; vol. 1670; SPIE.

Po–Chieh Hung; Colorimetric Calibration in Electronic Imaging Devices Using a Look–Up–Table Model and Interpolations; *Journal of Electronic Imaging;* Jan., 1993; pp. 53–61; vol. 2 No. 1.

Eddie Jennings, R. D. Holland and C. C. Lee; Error Analysis of Lookup Table Implementations in Device–Independent Color Imaging Systems; *Device–Independent Color Imaging;* 1994; pp. 98–107; vol. 2170; SPIE.

James M. Kasson; Tetrahedral Interpolation Algorithm Accuracy; *Device–Independent Color Imaging;* 1994; pp. 24–35; vol. 2170; SPIE.

Henry R. Kang; Comparisons of Three–Dimensional Interpolation Techniques by Simulations; *Device–Independent Color Imaging II;* 1995; pp. 104–114; vol. 2414; SPIE.

Katsuhiro Kanamori; A Study on Interpolation Errors and Ripple Artifacts of 3D Lookup Table Method for Nonlinear Color Conversions; *IS&T/SPIE Conference on Color Imaging: Device–Independent Color, Color Hardcopy, and Graphic Arts IV;* 1999; pp. 167–178; vol. 3648; IS&T/SPIE.

Paul Kubelka and Franz Munk; Ein Beitrag zur Optik der Farbanstriche; *Zeitschrift Für Technische. Physik;* 1931; pp. 593–601; No. 11a; Germany.

Paul Kubelka; New Contributions to the Optics of Intensely Light–Scattering Materials. Part I; *Journal of the Optical Society of America;* May, 1948; pp. 448–457; vol. 38 No. 5.

Karl J. Heuberger, Zhou Mo Jing and Serdar Persiev; Color Transformations and Lookup Tables; *Proceedings of the Technical Association of the Graphic Arts;* 1992; pp. 863–881; TAGA.

Henry R. Kang; Comparisons of Color Mixing Theories for Use in Electronic Printing; *Color Imaging Conference; Transforms & Transportability of Color;* 1993; pp. 78–83; IS&T/SID.

Robert Rolleston and Raja Balasubramanian; Accuracy of Various Types of Neugebauer Model; *Color Imaging Conference; Transforms & Transportability of Color;* 1993; pp. 32–37; IS&T/SID.

Henry R. Kang; Applications of Color Mixing Models to Electronic Printing; *Journal of Electronic Imaging;* Jul., 1994; pp. 276–287; vol. 3 No. 3; SPIE and IS&T.

Chang–Yeong Kim, In–So Kweon and Yang–Seock Seo; Color and Printer Models for Color Halftoning; *Selected Papers on Digital Halftoning;* 1997; pp. 710–724; vol. MS 154; SPIE.

Werner Praefcke; Robust and Fast Numerical Color Separation for Mathematical Printer Models; *IS&T/SPIE Conference on Color Imaging: Device–Independent Color, Color Hardcopy and Graphic Arts IV;* 1999; pp. 2–10; vol. 3648; SPIE.

Koichi Iino and Roy S. Berns; Building Color–Management Modules Using Linear Optimization I. Desktop Color System; *Journal of Imaging Science and Technology;* Jan./Feb. 1998; pp. 79–94; vol. 42 No. 1.

J. S. Arney, Tuo Wu and Christine Blehm; Modeling the Yule–Nielsen Effect on Color Halftones; *Journal of Imaging Science and Technology;* Jul./Aug. 1998; pp. 335–340; vol. 42 No. 4.

Jonathan S. Arney, Eric Pray and Katsuya Ito; Kubelka–Munk Theory and the Yule–Nielsen Effect on Halftones; *Journal of Imaging Science and Technology;* Jul./Aug. 1999; pp. 365–370; vol. 43 No. 4.

Patrick Emmel and Roger David Hersch; A Unified Model for Color Prediction of Halftoned Prints; *Journal of Imaging Science and Technology;* Jul./Aug. 2000; pp. 351–359; vol. 44 No. 4.

Guy Vachon; Modeling the Mixing Behavior of Inks with Polynomials; *Color Research and Applications;* Feb., 1988; pp. 46–49; vol. 13 No. 1; John Wiley & Sons, Inc.

Michael C. Mongeon; Image Transformation Into Device Dependent Color Printer Description Using $4^{th}$ Order Polynomial Regression and Object Oriented Programming Development of Image Processing Modules; *Color Imaging; Device–Independent Color, Color Hard Copy and Graphic Arts;* 1996; pp. 341–352; vol. 2658; SPIE.

Henry R. Kang and Peter G. Anderson; Neural Network Applications to the Color Scanner and Printer Calibrations; *Journal of Electronic Imaging;* Apr., 1992; pp. 125–135; vol. 1 No. 2; SPIE/IS&T.

Gabriel Marcu and Kansei Iwata; RGB–YMCk Color Conversion by Application of the Neural Networks; *Color Imaging Conference: Transforms & Transportability of Color;* 1993; pp. 27–32; IS&T/SID.

Satoshi Abe and Gabriel Marcu; A Neural Network Approach for RGB to YMCK Color Conversion; *IEEE Region 10's Ninth Annual International Conference;* 1994; pp. 6–9; IEEE.

Yoshifumi Arai, Yoshiki Nakano and Tetsuo Iga; A Method of Transformation from CIE L*a*b* to CMY Value by a Three–Layered Neural Network; *IS&T and SID's Color Imaging Conference; Transforms & Transportability of Color;* 1993; pp. 41–44.

Shoji Tominaga; Color Control Using Neural Networks and Its Application; *Color Imaging Device–Independent Color, Color Hard Copy and Graphic Arts;* 1996; pp. 253–260; vol. 2658; SPIE.

Shoji Tominaga; Color Conversion Using Neural Networks; *Color Imaging: Device–Independent Color, Color Hard Copy and Graphic Arts III;* 1998; pp. 66–75; vol. 3300; SPIE.

C. S. McCamy, H. Marcus and J. G. Davidson; A Color–Rendition Chart; *Journal of Applied Photographic Engineering;* Summer, 1976; pp. 95–99; vol. 2 No. 3.

Eggert Jung; Programmed and Complementary Color Reduction; *Proceedings of the Technical Association of the Graphic Arts;* 1984; pp. 135–150; TAGA.

R. Holub, C. Pearson and W. Kearsley; The Black Printer; *Journal of Imaging Technology;* Aug., 1989; pp. 149–158; vol. 15 No. 4.

J. W. Birkenshaw, M. Scott–Taggart and K. T. Tritton; The Black Printer; *Proceedings of the Technical Association of the Graphic Arts;* 1986; pp. 403–429; TAGA.

Michael Schwartz, Richard Holub and Jeffrey Gilbert; Measurements of Gray Component Reduction in Neutrals and Saturated Colors; *Proceedings of the Technical Association of the Graphic Arts;* 1985; pp. 16–27; TAGA.

Richard Holub and Wayne Kearsley; Color to Colorant Conversions in a Colorimetric Separation System; *Neugebauer Memorial Seminar on Color Reproduction;* 1989; pp. 24–35; vol. 1184; SPIE.

Gary G. Field; Color Variability Associated with Printing GCR Color Separations *Proceedings of the Technical Association of the Graphic Arts;* 1986; pp. 145–157; TAGA.

Po–Chieh Hung; Tetrahedral Division Technique Applied to Colorimetric Calibration for Imaging Media; *Proceedings of the Society for Imaging Science and Technology;* 1992; pp. 419–422.

Katsuhiro Kanamori and Hiroako Kotera; Color Correction Technique for Hard Copies by 4–Neighbors Interpolation Method; *Journal of Imaging Science and Technology;* Jan./Feb. 1992; pp. 73–80; vol. 36 No. 1.

Shigeki Nakauchi, Masahiro Imamura and Shiro Usui; Color Gamut Mapping by Minimizing Perceptual Differences between Images; *Systems and Computers in Japan;* 1998; pp. 46–55; vol.29 No. 10.

Shigeki Nakauchi, Satoshi Hatanaka and Shiro Usui; Color Gamut Mapping Based on a Perceptual Image Difference Measure; *Color Research and Application;* Aug., 1999; pp. 280–291; vol. 24 No. 4.

Joanna L. Power, Brad S. West, Eric J. Stollnitz and David H. Salesin; Reproducing Color Images as Duotones; *Proceedings of SIGGRAPH 96, in Computer Graphics Proceedings, Annual Conference Series;* 1996; pp. 237–248.

Eric J. Stollnitz, Victor Ostromoukhov and David H. Salesin; Reproducing Color Images Using Custom Inks; *Proceedings of SIGGRAPH 98 in Computer Graphics Proceedings, Annual Conference Series;* 1998; pp. 1–8.

Shoji Tominaga; A Neural Network Approach to Color Reproduction in Color Printers; *IST and SID's Color Imaging Conference: Transforms and Transportability of Color;* 1993; pp. 173–177.

Shoji Tominaga; Control Scheme For Printers Using More Than Three Color Inks; *Electronic Imaging: Processing, Printing and Publishing in Color;* 1998; pp. 286–293; vol. 3409.; SPIE.

Kurt Hornik, Maxwell Stinchcombe and Halbert White; Multilayer Feedforward Networks are Universal Approximators; *Neural Networks;* 1989; pp. 359–366; vol. 2 No. 5; Pergamon Press; New York.

T. Belytschko, Y. Krongauz, D. Organ, M. Fleming and P. Krysl; Meshless Methods; An Overview and Recent Developments; *Computer Methods in Applied Mechanics and Engineering;* 1996; pp. 1–47; vol. 139.

Ansi. Graphic technology–Input data for characterization of 4–color process printing; 1993; ANSI IT8.7/3.

K. Schittkowski; NLPQL: A Fortran Subroutine Solving Constrained Nonlinear Programming Problems; *Annals of Operations Research;* 1985/6; pp. 485–500; No. 5; J. C. Baltzer A.G.

C. Bradford Barber, David P. Dobkin and Hannu Huhdanpaa: The Quickhull Algorithm for Convex Hulls; *ACM Transactions on Mathematical Software;* Dec., 1996; pp. 1–15; vol. 22 No. 4.

Raja Balasubramanian and Edul Dalal; A Method for Quantifying the Color Gamut of an Output Device; *Color Imaging: Device–Independent Color, Color Hard Copy and Graphic Arts II;* 1997; pp. 110–116; vol. 3018; SPIE.

J A. C. Yule; Theory of Subtractive Color Photography III. Four–Color Processes and the Black Printer; *Journal of the Optical Society of America;* Aug., 1940; pp. 322–331; vol. 30 No. 8; NY.

Abdel Ghany Saleh; Investigation into the Application of Achromatic Synthesis to the Printing Industry; *Proceedings of the Technical Association of the Graphic Arts;* 1984; pp. 151–163; TAGA; NY.

A. Johnson; Practical Implementation of Optimum Colour Reproduction; *The Journal of Photographic Science;* Jul./Aug., 1984; pp. 145–148; vol. 32 No. 4.

Chiho Nakamura and Kazuo Sayanagi; Gray Component Replacement by the Neugebauer Equations *Neugebauer Memorial Seminar on Color Reproductions;* 1989; pp. 50–63; vol. 1184; SPIE.

Bruce A Frost; The Gray Component Replacement—A New Trend in Color Reproduction; *Proceedings of the Technical Association of the Graphic Arts;* 1986; pp. 394–401; TAGA.

Henry R. Kang; Gray Component Replacement Using Color Mixing Models; *Color Hard Copy and Graphic Arts III;* 1994; pp. 287–296; vol. 2717; SPIE.

Richard Holub, Wayne Kearsley and Christopher Pearson; Color Systems Calibration for Graphic Arts: II. Output Devices *Journal of Imaging Technology;* Apr., 1988; pp. 53–60; vol. 14 No. 2.

Masato Tsukada and Johji Tajima; New Algorithm for UCR Using Direct Color Mapping; *Color Hard Copy and Graphic Arts IV;* 1995; pp. 365–374; SPIE.

Tony Johnson; Polychromatic Colour Removal—Revolution or Evolution?; *Proceedings of the Technical Association of the Graphic Arts;* 1985; pp. 1–15; TAGA.

Hitoshi Ogatsu, Kazumasa Murai and Shinji Kita; A Flexible GCR Based on CIE L*a*b*; *Device–Independent Color Imaging II;* 1995; pp. 123–133; vol. 2414; SPIE.

Raja Balasubramanian and Reiner Eschbach; Reducing Multi–Separation Color Moirè by a Variable Undercolor Removal and Gray Component Replacement Strategy; *Journal of Imaging Science and Technology;* Mar./Apr., 2001; pp. 152–165; vol. 45 No. 2.

Raja Balasubramanian and Martin S. Maltz; Refinement of Printer Transformations Using Weighted Regression; *Color Imaging: Device–Independent Color, Color Hard Copy and Graphic Arts;* 1996; pp. 334–340; vol. 2658; SPIE.

Jeng–Nan Shiau and Leon C. Williams; Semiautomatic Printer Calibration with Scanners; *Journal of Imaging Science and Technology;* May/Jun., 1992; pp. 211–219; vol. 36 No. 3; IS&T.

Hideaki Haneishi, Tsutomu Hirao, Akihiro Shimazu and Yoichi Miyake; Colorimetric Precision in Scanner Calibration Using Matrices; *Proceedings of the IS&T/SID 1995 Color Imaging Conference: Color Science, Systems and Applications;* 1995; pp. 106–108.

P. Emmel and R. D. Hersch; Colour Calibration for Colour Reproduction; *Proceedings of the 2000 IEEE International Symposium on Circuits and Systems;* 2000; pp. 105–108; vol. 5; Geneva, Switzerland.

Lorien Pratt and Barbara Jennings; A Survey of Transer Between Connectionist Networks; *Connection Science;* 1996; pp. 163–184; vol. 8 No. 2; International Periodical Publishers.

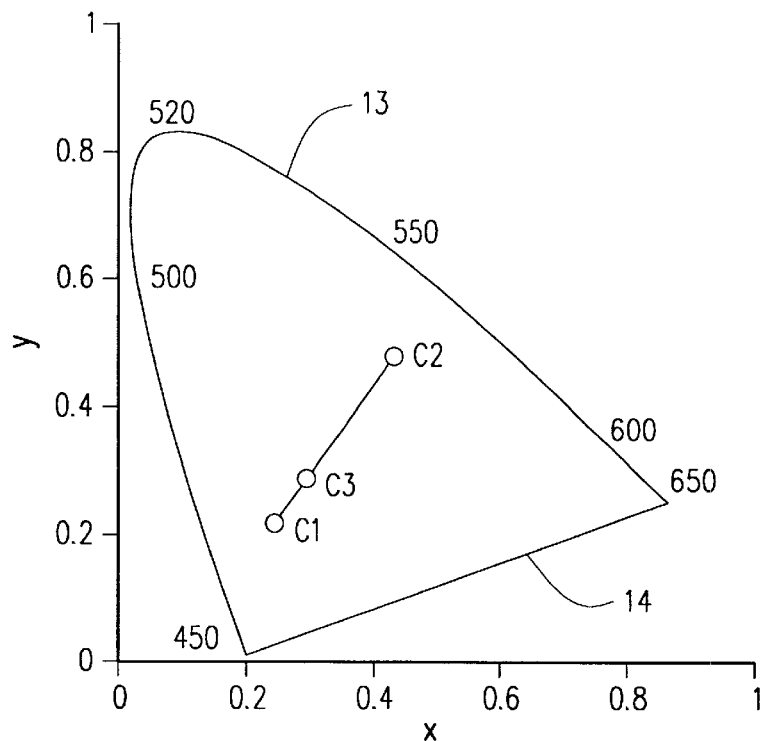
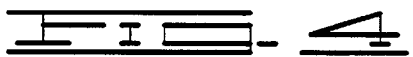
$$L^* = 116 \left(\frac{Y}{Y_W}\right)^{\frac{1}{3}} - 16$$
$$a^* = 500 \left(\left(\frac{X}{X_W}\right)^{\frac{1}{3}} - \left(\frac{Y}{Y_W}\right)^{\frac{1}{3}}\right)$$
$$b^* = 500 \left(\left(\frac{Y}{Y_W}\right)^{\frac{1}{3}} - \left(\frac{Z}{Z_W}\right)^{\frac{1}{3}}\right)$$
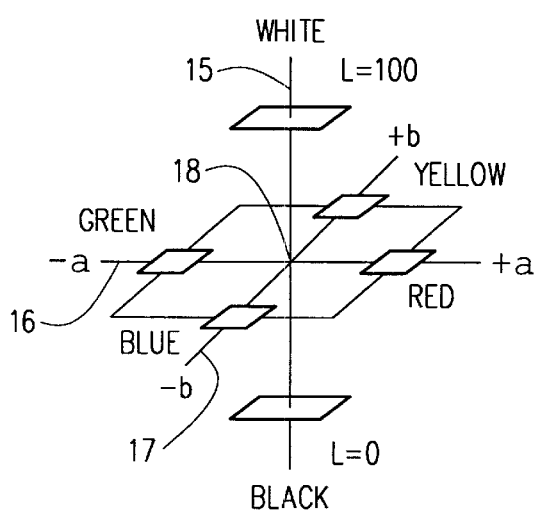

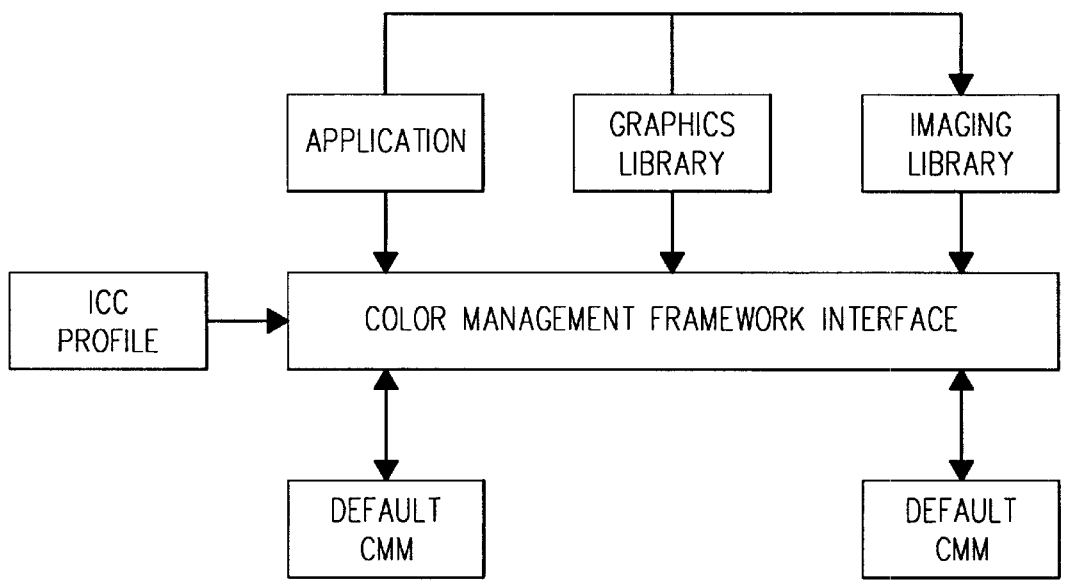
*PRIOR ART*
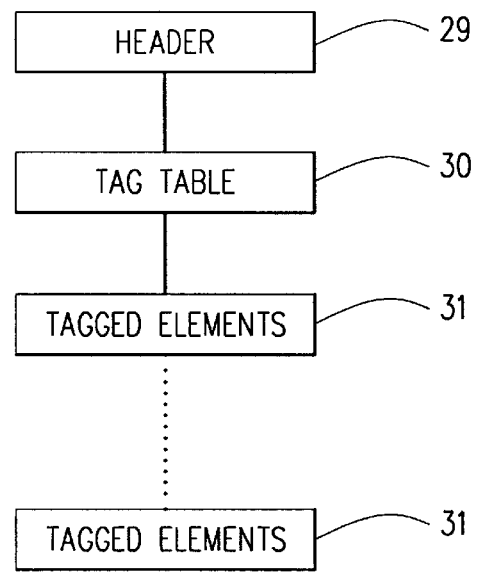
*PRIOR ART*

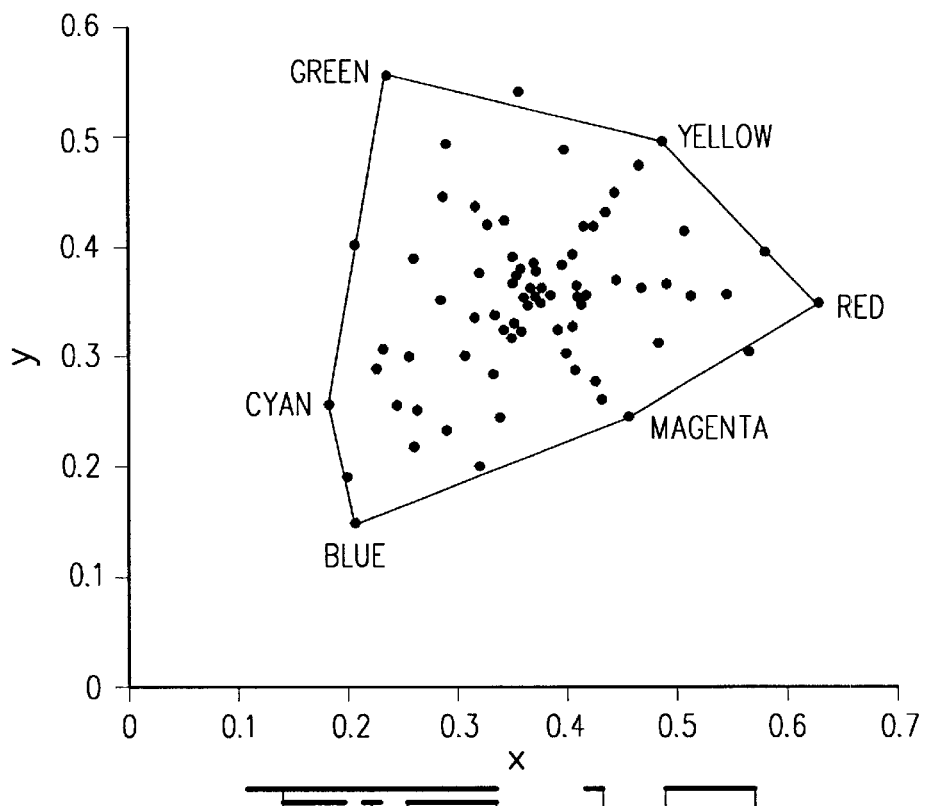
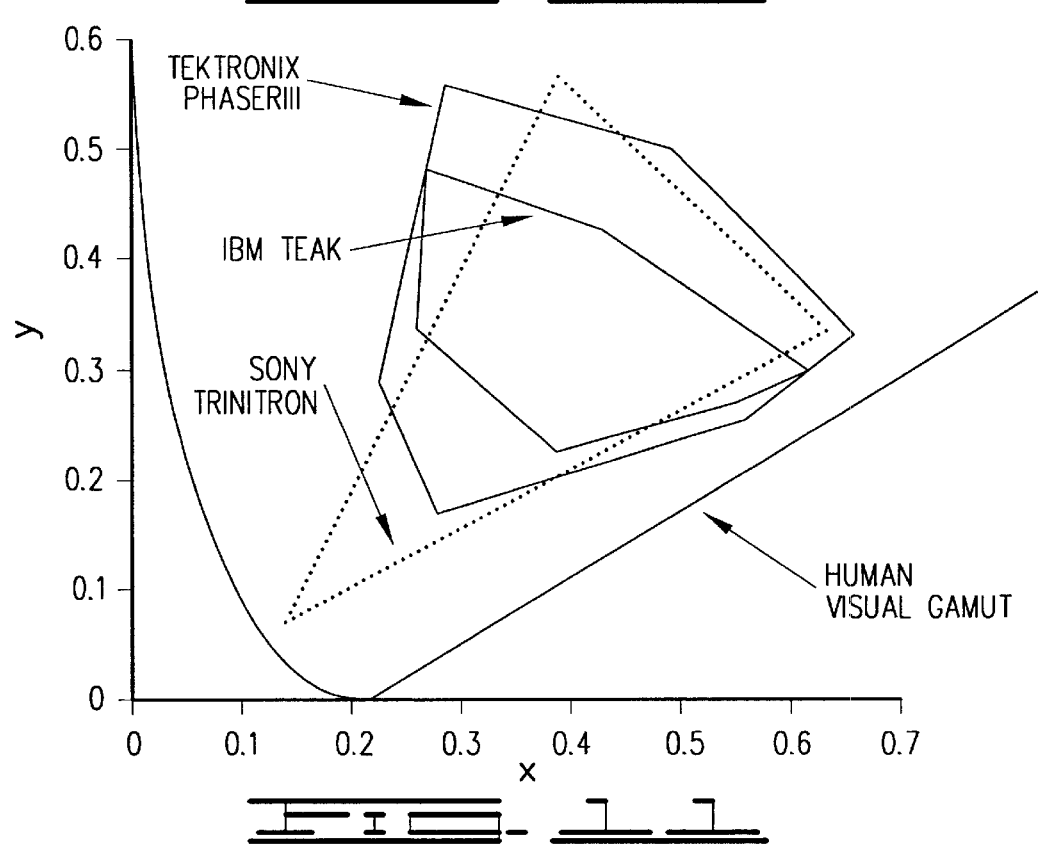

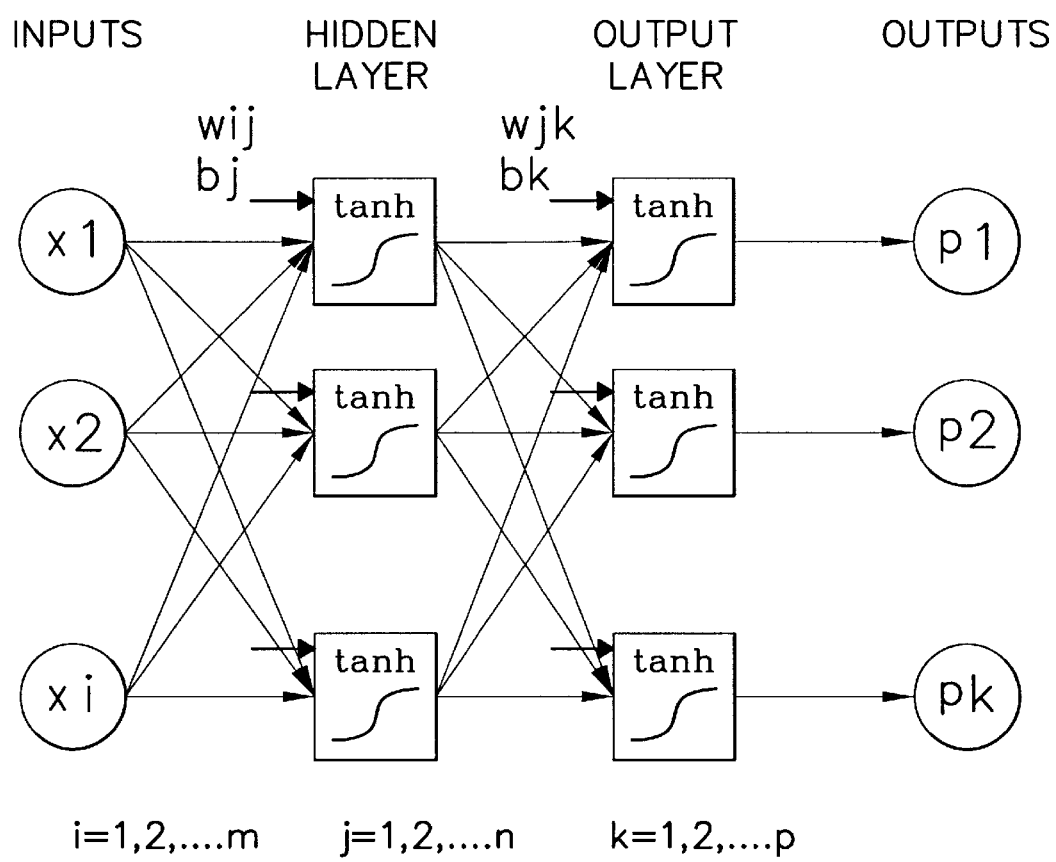

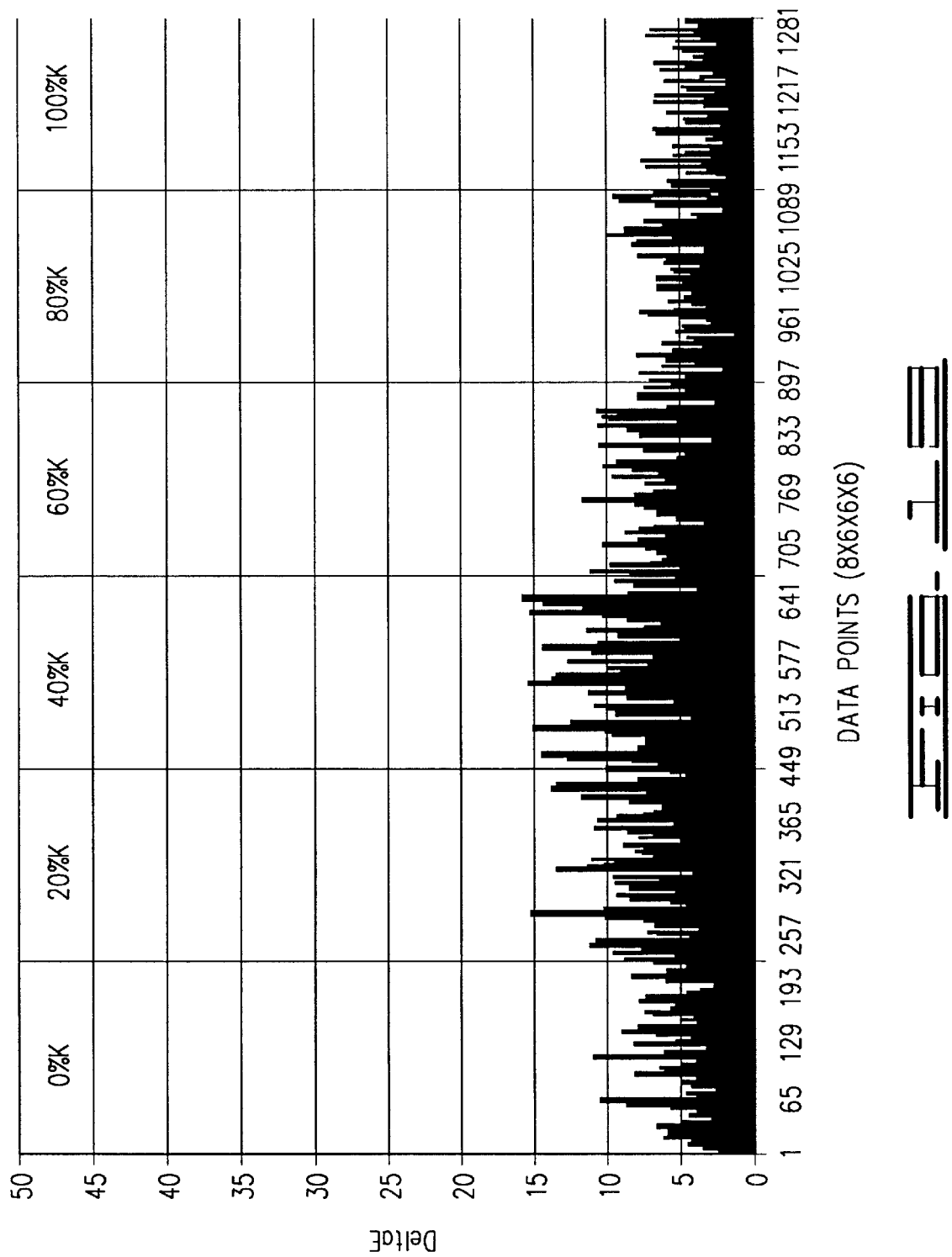

FIG. 25A
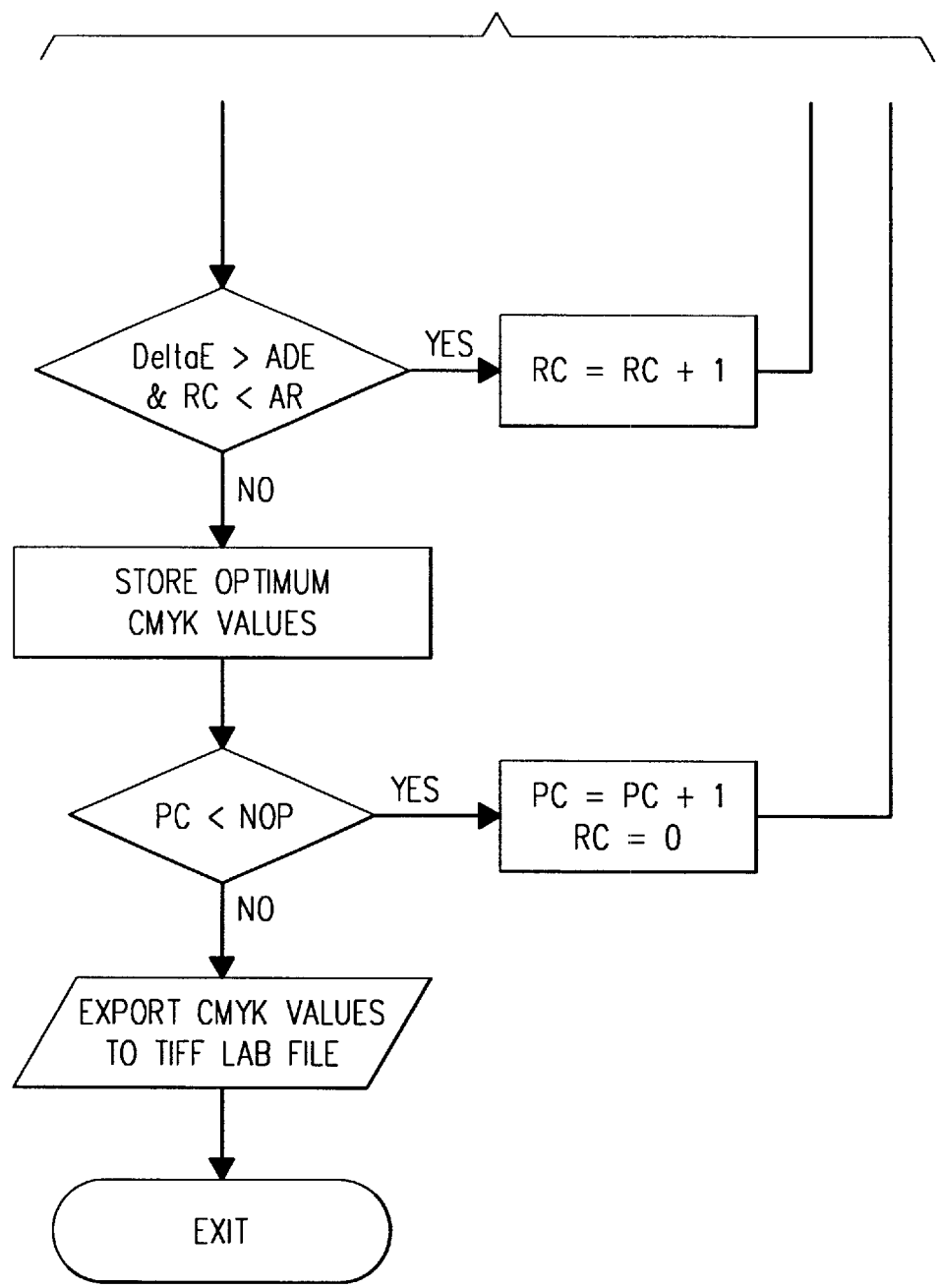
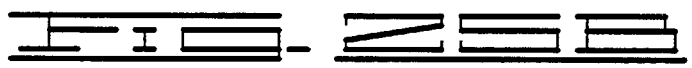

THE COMPUTED DIFFERENCE BETWEEN TWO COLORS IS GIVEN BY THE CIELAB COLOR DIFFERENCE FORMULA:

$$\Delta E^*_{ab} = \left[ (\Delta L^*)^2 + (\Delta a^*)^2 + (\Delta b^*)^2 \right]^{\frac{1}{2}}$$

COLOR PRINTER CHARACTERIZATION USING OPTIMIZATION THEORY AND NEURAL NETWORKS

CROSS-REFERENCE TO RELATED APPLICATION

This application claims benefit of provisional patent application Ser. No. 60/066,844, filed on Nov. 25, 1997, and entitled COLOR PRINTER CHARACTERIZATION USING OPTIMIZATION THEORY AND ARTIFICIAL NEURAL NETWORKS.

BACKGROUND OF THE INVENTION

1. Field of the Invention

This invention relates to color management methods, apparatus and systems.

2. Description of the Related Art

While color management has many goals, in the digital color printing industry, the accurate and the characterization of a color printer's gamut and the subsequent image color matching has become a necessity. The main problem is that characterizing color printers usually involves measuring a large number of color patches that have been printed by the printer in question. In addition, the information that is obtained by measuring these color patches is only valid for that particular instance of the printer, thus creating the need for a quick printer re-characterization method. Printer characterization systems that use a small number of color patch measurements for ICC profile generation exist, but they fail to give accurate results. A traditional approach to generating ICC profiles and to performing color matching involves linear interpolation schemes that require large profile lookup tables.

An additional important consideration to this art is any accuracy/cost tradeoffs that can be made between the accuracy of a printed color and the cost of the ink that produces that printed color. For example, it is known that a slight color error between a signal-requested color and an ink-produced color can be tolerated because the human eye is incapable of noticing such a slight color error. Any ink cost optimization scheme that uses this inability of the human eye to notice slight color errors would be a valuable contribution to the art.

The nature of color as it relates to the electromagnetic spectrum is shown in FIG. 1. Light is a form of electromagnetic energy or electromagnetic waves. Visible light is a form of electromagnetic energy, very much like ultraviolet, infrared, and radio waves. Electromagnetic waves are characterized by their wavelength, which can vary from kilometers to about a millionth of a millimeter. Light waves have wavelengths of about half a millionth of a millimeter, and the unit used for measuring visible light is the nanometer (nm. $10^{-9}$ m). FIG. 1 uses a logarithmic scale to illustrate a wide range of wavelengths. Color can be defined as the perceptual results of electromagnetic waves in the visible region of the spectrum, having wavelengths in the region of about 400 nm to 700 nm incident upon the eyes of a human. That is, color exists only in the human brain.

Humans can see colored objects due to the three different types of cones that are present with the retina of the human eye. These cones are referred to as S, M, and L (for short, medium and long wavelengths), and have their respective maximum sensitivities at 445 nm (violet), 535 nm (green) and 570 nm (yellow).

Distribution of these three types of cones is not uniform over the eye's retinal surface, and the number of S cones is much less than the number of the other two types of cones. More specifically, the cone ratios are 1 to 20 to 40, respectively, for the S, M and L cones.

A white surface, such as a piece of white paper, usually has the same visual appearance under both tungsten light and fluorescent light. This phenomenon is termed color constancy, and is due to the ability of the human brain to compensate for changes in both the level and the color of lighting. Sometimes extreme changes in the color appearance of an illumination source may cause detectable changes in the visual appearance of colors. Nevertheless, color constancy is an important feature of human vision.

Three basic perceptual attributes that characterize a color stimulus are: Brightness: Attribute of a color by which it seems to exhibit more or less light: Hue: Attribute of a color that causes the color to be perceived as being other than black, white, or gray; and Saturation: Attribute of a color by which it appears to be pure and containing no white or gray.

The term lightness is typically used to describe the brightness of a color relative to that of an equally illuminated white background. If illumination intensity changes, then both the color and the white background change equally, thereby maintaining the same lightness. In addition, colorfulness can be judged in proportion to the brightness of white, and is termed chroma. Lightness and chroma are, therefore, defined as: Lightness: The brightness (light/dark) of an area judged relative to the brightness of a similarly illuminated area that appears to be white or highly transmitting; and Chroma: The colorfulness (strong/weak) of an area judged in proportion to the brightness of a similarly illuminated area that appears to be white or highly transmitting.

Colorfulness can also be judged relative to the brightness of the same area, instead of to the brightness of a white area. This again is saturation. These definitions only apply to related colors; that is, to colors that are viewed together under the same conditions. Unrelated colors, on the other hand, are colors that are isolated from each other.

In the early years of color science, colored surfaces were compared by placing them side by side under a standard light source. This methodology was used since little was known about the human eye and its functions. Today, color science has a good understanding of the eye's cone response, and of how the cones interact to produce a sensation of color within the human brain. A software or hardware model of color must take into account a knowledge of the human mechanism of color vision.

Since humans have the three types of cones S, M, and L, and since photopic vision and color vision are a function of three variables, it is expected that an apparatus/method/system for the evaluation of color from spectral power data would require three different weighting functions.

An internationally-accepted method for evaluating color is called trichromic color matching or three color matching. FIG. 2 shows a basic experimental arrangement for trichromatic color matching. In FIG. 2, the target color to be matched is projected on the lower half of the eye's field of view, while, on the other half of the filed of view, a mixture of three lights or stimuli is projected. The three projected light stimuli are usually 700 nm (red), 546.1 nm (yellowish green) and 435.8 nm (bluish violet). Color matching is then achieved by changing the intensities of the red, green, and blue source, until the target color is matched.

Many objects appear to be colored by absorbing and/or reflecting portions of the light that is incident on them, rather than by emitting light themselves. It is, therefore, clear that both the quality and the type of light affects a human viewer's perception of a reflective color. Humans are exposed to several light sources that have very diverse spectral characteristics. For example, incandescent light bulbs (light is emitted by a heated filament often made of tungsten) tend to distribute the majority of their energy to the longer wavelengths. This characteristic makes incandescent light appear more yellow than natural day light, which light is fairly neutral.

Any illuminant source, therefore, can be defined as a special kind of light source that is defined in terms of its spectral characteristics. Since most sources of illumination produce light by heating an object, these sources can be characterized by specifying the temperature of a black body radiator that appears to have the same hue.

Color temperature $T_c$ (in units of Kelvin, K) is defined as the temperature at which a Plankian black body radiates light that has the same chromaticity as that of a given light source. This definition is only applied to light sources that are very similar to Plankian radiators. The Correlated Color Temperature $T_{cp}$ is defined as the Plankian radiator temperature that most closely approximates the hue of the light source in question. This second definition applies to sources that do not exactly resemble a Plankian radiator.

The CIE standard illuuminant A is used to simulate incandescent lighting and it is created using a tungsten light source with a color temperature of 2856 K. The CIE standard illuminant B is used to simulate direct noon sunlight, neutral in hue, by filtering a tungsten light source with a color temperature of 4874 K. The CIE standard illuminant C is used to simulate average daylight by again filtering a tungsten light source with a color temperature of 6774 K. The filter consists of a tank of blue liquid, the chemical composition of which is specified by the CIE. These three CIE standard illuminants are defined within the wavelength range of 380–700 nm, and do not include the ultraviolet region that is needed to accurately describe fluorescent colors.

In 1963, the CIE recognized deficiencies of the first three standard illuminants, and defined a new family of light sources called the D series illuminants. Each such illuminant is given the name D with a two digit subscript to indicate the color temperature of the illuminant. The most common D illuminants in the graphic arts industry corresponds to a temperature of 5000 K, and are thus termed D50. The spectral distribution of a D50 illuminant is very difficult to reproduce with an artificial light. There is no actual apparatus specified as part of the CIE standard. Instead, there is a procedure to determine how well a given light source matches the color matching properties of the D50 illuminant. Illuminant E is a theoretical illuminant with a nearly flat spectral profile. Illuminant E light does not exist, but it is used to perform computations in color science. F series illuminants are designed to simulate fluorescent lighting. Fluorescent lamps consist of a glass tube filled with low pressure mercury gas, coated on the inside with phosphors. The mercury gas is charged by an electrical current which produces ultraviolet radiation. The phosphors then absorbs the radiation and re-emits the radiation at a broader range of wavelengths in the visible part of the spectrum. The process of re-emitting incident radiation at different wavelengths is called fluorescence. There are twelve different F illuminants, differing in the type of phosphors used. The CIE recommends F2, F7 and F11 as reasonable illuminants for evaluating colors that will be viewed under fluorescent lighting environments. The spectral profile of a fluorescent light is easily distinguished by the sharp spikes caused by the mercury gas.

There are several ways to calculate the spectrum and, therefore, the tristimulus values of a light source. Methods, such as visual color matching and calculation from spectral data can be used. A first method uses additive mixtures of red, green and blue light. This method is reliable, but it is time consuming and is usually not considered for tristimulus value determinations. A second method requires the CIE color matching functions, source spectral data, and illuminant spectral data in some cases. Obtaining this spectral data involves spectroradiometry and spectrophotometry.

Since color perception is a complicated process, simple models are defined in order to describe color, using the least number of parameters. Typically, color spaces use three primary colors from which others are obtained by mixture. In other cases, color is defined using parameters, such as lightness, hue and saturation.

Color spaces can be classified into device dependent (RGB, CMYK) and device independent (LAB, XYZ, etc.). RGB and CMYK color spaces are termed "device dependent" because two different color video monitors, or two different color printers reproduce the same percentages of RGB or CMYK very differently, depending on the monitor phosphor or printer ink (toner) that is used.

Device-independent color spaces communicate color accurately since they do not use device color primaries directly. The only disadvantage of the device-independent approach is that mathematical transformations and interpolations are usually required.

The RGB color space is described as a combination of the three additive (adding light to darkness) primaries red, green, and blue. The RGB color space is used for devices that mimic the trichromtic properties of the human eye, such as color monitors, color scanners and color projectors.

The CMYK color space describes color as a combination of the three subtractive (removing light from white) primaries cyan, magenta, and yellow. Color printers use this color space by applying layers of CMY ink onto white paper. A fourth black primary color black (K) is typically used to reduce the total amount of ink that is required in order to produce a given color. For example, a neutral gray color can be produced by using 2 units of each of the three CMY primaries (total of 6 units), or this same neutral gray color can be produced by using 1 unit each of the three CMY primaries, and 1 unit of black (total of 4 units).

In the XYZ color space of FIG. 3, the three XYZ tristimulus values define a three-dimensional color space that encloses all visible colors. In certain occasions, it is useful to examine colors by removing the lightness component, thereby, mapping a XYZ solid area 11 onto a two-dimensional plane 12. To achieve this, the tristimulus values are normalized.

$$x = \frac{x}{X+Y+Z}$$
$$y = \frac{y}{X+Y+Z}$$
$$z = \frac{z}{X+Y+Z}$$
$$x+y+z=1$$

Since all primaries add to unity, it is customary to drop the z term. The resulting two-dimensional diagram is called the CIE 1931 chromaticity diagram, and is shown in FIG. 4. In the chromaticity diagram of FIG. 3, only hue and saturation are represented. The curved line in FIG. 3 indicates where all single wavelength colors of the spectrum lie, and this line is known as the spectral locus. If two color stimuli C1, C2 are additively mixed together, then the point C3 representing the mixture will always lie on a line that connects the two colors, as shown in FIG. 3. The line 14 that connects the 450 nm color and the 650 nm color is an artificial boundary, termed the purple boundary, and represents all of the colors seen when blue and red are mixed together.

A color space is called uniform, or approximately uniform, when equal distances correspond to equally perceived color differences (as seen by the human eye). The XYZ and the xy color spaces of FIGS. 3 and 4, respectively, accurately represent color, but they lack perceptual uniformity.

For example, FIG. 4 shows the xy chromaticity coordinates of colors that correspond to five equal increments of cyan, magenta and yellow. It can be seen that while this CMY color space is relatively uniform, the xy and, therefore, the XYZ spaces, are far from it. A mathematical transformation is needed for the XYZ spaces to exhibit reasonable perceptual uniformity.

Two transformations, called the CIELUV and CIELAB, reduce the non-uniformity of the XYZ space from 80:1 to about 6:1. If the luminance Y of a given color is divided by the luminance of a reference white, a relative scale from 0 to 100 is defined. It can be seen that the measured luminance does not correspond to the perceived lightness, since the majority of the dark colors are found at one end of the scale.

The CIELAB color space color model addresses the problem of perceptual non-uniformity by transforming the XYZ color space. The result is a three-dimensional, approximately uniform, color space having three orthogonally arranged axes L, a, b, respectively numbered 15, 16, 17 in FIG. 5. As shown in FIG. 5, the L axis 15 extends between black (L=0) and white (L=100), the a axis 16 extends between red (a+) and green (a−), and the b axis 17 extends between yellow (b+and blue (b−). Colors whose coordinates lie adjacent to origin 18 are pale, and saturation increases as the coordinates of a color lie further away from origin 18.

It is important to graphic arts and the color output device industry that accurate instrumentation be available for describing and communicating color information. Three main types of color measurement instruments are densitometers, calorimeters and spectrophotometers.

A densitometer (unlike a spectrometer) measures color density; that is, the ability of a surface to absorb incident light. Reflectance and density are usually inversely proportional to each other in that as the reflectance of a surface decreases, the color density of the surface increases. Since measured reflectivity values can vary from almost zero to 1, this reciprocal relationship provides color density values ranging from zero to infinity. This large dynamic range of values can be condensed to a more reasonable range by taking the logarithm of the ratio which is an industry standard known as log density.

Densitometers, very much like spectrophotometers, have built in response functions that describe the sensitivity of the instrument at each wavelength. For instance, if the color density of cyan ink needs to be calculated, the densitometer needs to determine how much red is absorbed, therefore, isolating the cyan from the other inks that are present. The American National Standards Institute has specified a series of response curves, termed the ANSI Status classifications, depending upon the material to be measured. The most common ANSI classifications are Status T (reflective) used for measuring graphic arts production materials, such as press proofs, off-press proofs and press sheets, Bf Status E (reflective) European choice over Status T, Bf Status A (reflective or transmissive) used for measuring color photographic materials, such as photographic prints, 35 mm slides, etc.

Colorimeters are devices that measure color similar to the way in which the human eye perceives color. These devices measure the tristimulus values of a stimulus by using three sensors that have response curves similar to the response curves of the cones within the human eye. The majority of calorimeters report the color information using CIE color spaces, such as XYZ, xyY, Luv, or LAB (Lab). Most calorimeters can also measure and report ΔE values between a given color and a measured color.

A spectrophotometer measures spectral data for a target color. This is done by dividing the visible spectrum from 390 nm to 700 nm into small discrete bands. The width of each band in nanometers is called its bandwidth. Typically, a constant bandwidth of 10 nm (32 band) is sufficient for capturing color information. There are spectrometer devices that have non-uniform bandwidths, called variable bandwidth spectrophotometers. Since spectral data can be converted to tristimulus values, spectrophotometers can usually report both colorimetric and color density values. Since some computation is required to obtain calorimetric data from spectral data, a computer or an internal processor is usually a part of the device, thus making spectrophotometers the most expensive of the three devices. In calculating tristimulus values from spectral data, visible spectrum is first divided into small wavelength intervals. For each interval, the average intensity of the color is calculated, as well as the tristimulus values for each wavelength, using color matching functions. The overall XYZ values are then calculated using the equation:

$$X = K(P_1 \bar{x}_1 + P_2 \bar{x}_2 + P_3 \bar{x}_3 \ldots)$$

$$Y = K(P_1 \bar{y}_1 + P_2 \bar{y}_2 + P_3 \bar{y}_3 \ldots)$$

$$Z = K(P_1 \bar{z}_1 + P_2 \bar{z}_2 + P_3 \bar{z}_3 \ldots)$$

where K is a constant value that normalizes Y to 1.

For reflective colors, the power P values are calculated by multiplying their reflectance factors with the spectral power distribution of the light source. A spectrophotometer uses a photocell to measure the brightness at each wavelength interval, and has standard observer color matching functions and illuminant spectral functions in memory in order to perform calculations.

Metameric stimuli are color stimuli that have the same tristimulus values and different spectral distributions for the same illuminant and the same human observer. This phenomenon is called metamerism. Color printers rely on metamerism to substitute equal percentages of the CMY inks with black ink, and still maintain the same color values for the new CMYK ink.

FIG. 6 illustrates how the spectral information 19 that is contributed by an illumination source, the spectral information 20 that is contributed by the surface on which an image is printed, and the spectral information 21 that is contributed by the tristimulus response of the eye of a human viewer can be combined at 22 to form a XYZ color space 23, such as shown in FIG. 5, which color space 23 can then be converted to xyZ, LAB or LUV color spaces 24.

SUMMARY OF THE INVENTION

The present invention relates to the use of a relatively small number of carefully selected and individually different images of one unique color that have been produced by a color printer to train a gamut-defining network, such as neural network. In a first embodiment of the invention, this gamut-defining network is used to generate a printer profile lookup table for use in a color management system, wherein an input image signal controls the color printer to print in accordance with the content of the lookup table. In a second embodiment of the invention, the gamut-defining network is directly used to control printing by the color printer, so as to produce color prints in accordance with a comparison of the input image signal to the printer's gamut.

The present invention fills a need that remains in the art for a system that uses a small number of color patch measurements, provides accurate printer characterization, generates ICC profiles, and performs color management.

The present invention provides a new and unusual optimization theory based Color Management System (CMS). One aspect of the invention comprises a CMS tool that uses artificial neural networks for performing efficient color space conversion, and uses optimization to perform printer gamut mapping and gray component replacement, it being recognized that others have taught the general use of neural networks in CMS.

This invention provides a new and unusual approach to performing color management, and to generating International Color Consortium (ICC) printer profiles, while at the same time, reducing the number of measurements that are required. Color printer characterization and the generation of accurate ICC printer profiles usually requires a large number of measured data points, and complex interpolation techniques. This invention provides a neural network representation and optimization based apparatus and method for performing color space conversion, printer gamut mapping and gray component replacement.

A neural network architecture is provided for performing CMYK to LAB color space conversion for a color printer, such as a CMYK IBM Network color printer. A feed forward neural network is trained using an ANSI/IT-8 basic data set, consisting of 182 data points, or using a reduced data set of 150 or 101 data points when linear portions of the 182 data set are eliminated. A 5-to-7 neuron neural network architecture is preferred for color space conversion purposes. Neural network functions and optimization routines are used to perform printer gamut mapping and gray component replacement.

This invention provides novel optimization and artificial neural network models that carry out color space conversion, printer gamut mapping and gray component replacement. Features of the present invention include: (1) Performing color space characterization using a relatively small number of color patch measurements; (2) Using a single step color management process; (3) Performing accurate color management; (4) Operating as a stand alone, image specific, color management system; (5) Generating ICC printer profiles that conform to the ICC specification; (6) Allowing easy printer calibration; and (7) Allowing very different rendering intent to be handled in a convenient manner.

In a the method in accordance with this invention, (1) a relatively small number of carefully selected and different color patch prints are produced using a CMYK color printer, (2) these color patch prints are then used to train a gamut-defining network, such as a neural network, preferably comprising from 5 to 7 neurons, thereby defining the gamut of the CMYK printer, as this gamut is defined by the relatively small number of color panel prints. In a first embodiment of the invention, this trained gamut-defining network is used to generate a printer profile lookup table that converts LAB values to corresponding CMYK values in accordance with the gamut of the CMYK printer. In a second embodiment of the invention, the apparatus/method is used to directly control a CMYK printer, wherein LAB input image signals control the CMYK color printer in accordance the gamut-defining network.

In accordance with an important feature of this invention, the gamut-defining network is used in combination with a non-linear optimization procedure to map any image color to a CMYK value that is within the printer's gamut.

When a lookup table is being constructed in accordance with this invention, a uniform grid of LAB values are inputted so that these LAB values can be mapped to CMYK values that are within the printer's gamut, and a lookup table is thereby embedded in an ICC profile that converts LAB image information into a CMYK image that best approximates the LAB image information for the printer under consideration.

When a printer is being directly controlled in accordance with this invention, the LAB image information input to the gamut-defining network, and this network operates convert LAB image information into a CMYK image that best approximates the LAB image information for the printer under consideration.

These and other features and advantages of the invention will be apparent to those of skill in the art upon reference to the following detailed description, which description makes reference to the drawing.

BRIEF DESCRIPTION OF THE DRAWINGS

FIG. 4 shows a two-dimensional xy color space.

FIG. 5 shows a three-dimensional CIELAB color space.

FIG. 8 is a showing of a prior color management framework architecture by ICC.

FIG. 9 show the form of an ICC device profile.

FIG. 10 shows the color gamut of a commercially available color printer in xy chromaticity coordinates.

FIG. 12 shows a multi-layer, feed forward, neural network of the type used in the present invention, it being recognized that other neural network architectures are also useful in the present invention.

FIG. 18 shows the neural network architecture that is used for each LAB component in accordance with the present invention.

FIG. 19 shows an example error histogram for the 5 neural network of FIG. 18.

FIG. 26 shows the reverse communication optimization that is performed by the Coptim class shown in FIG. 22.

DESCRIPTION OF PREFERRED EMBODIMENTS

Figure 1:
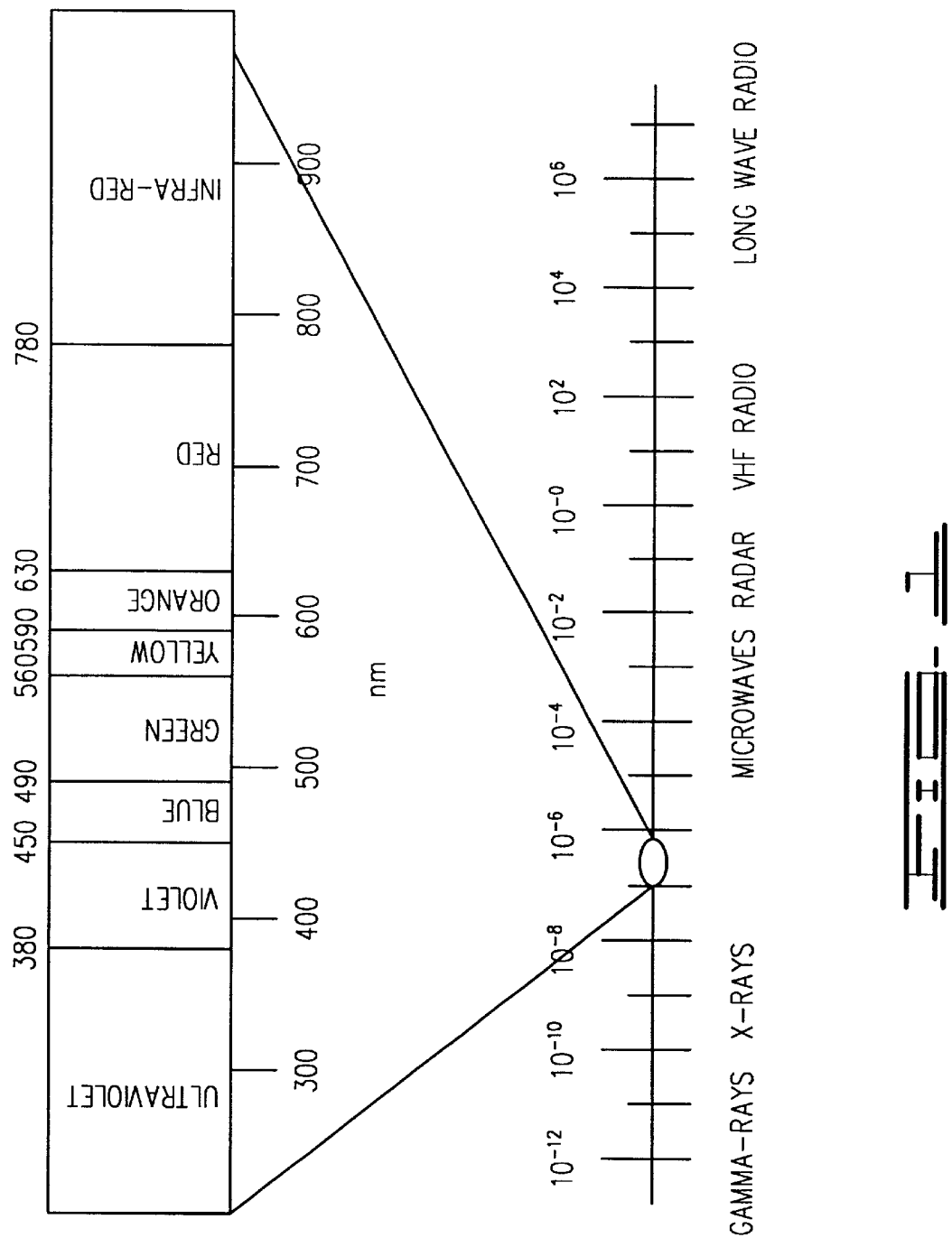
FIG. 1 is a logarithmic scale showing of the electromagnetic spectrum wherein the ultraviolet to infra-red portion has been expanded to show the various colors that are visible to humans.
Figure 2:
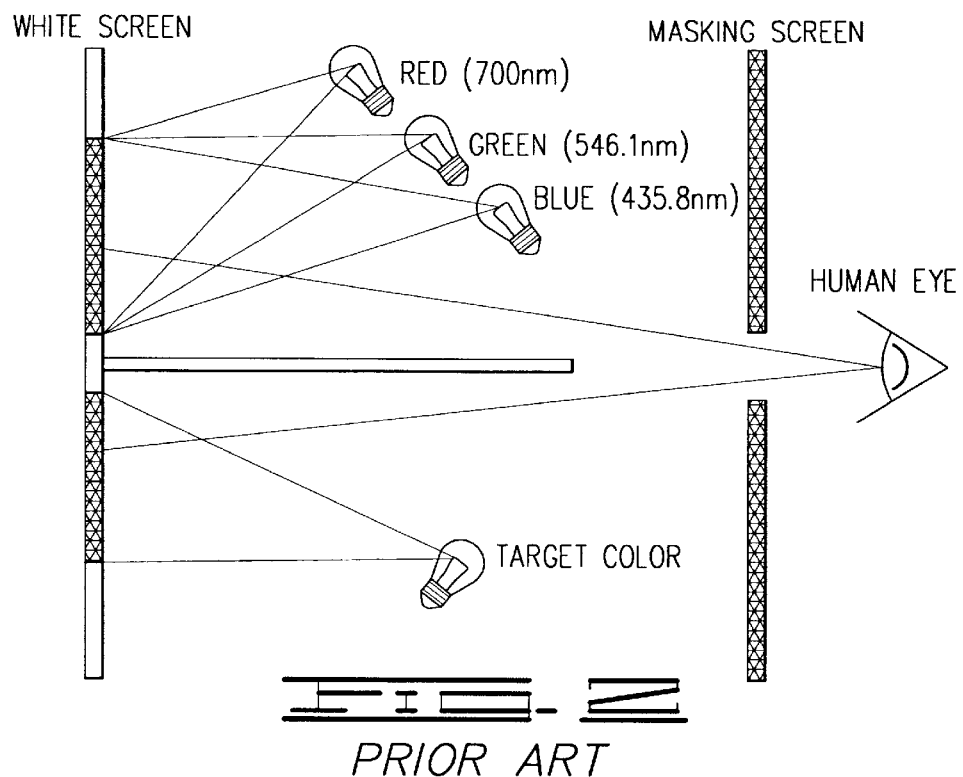
FIG. 2 shows a prior art means for trichromatic color matching.

While the invention is shown and will be described with reference to preferred embodiments thereof, it will be understood by those skilled in the art that various other changes in the form and details of the invention may be made without departing from the spirit and scope of the invention.

Presently preferred embodiments of the invention, and many of its improvements, will be described with a degree of particularity. It should be understood that this description is made by way of example, and that the invention is defined by the scope of the claims.

Color Management Systems

A Color Management System (CMS) can be defined as a layer of software that is resident on a computer, and that negotiates color reproduction between a computer application and a color output device such as a printer. A CMS is necessitated by the color inconsistency that occurs between a color image input and a color print output, this difference being caused by different output devices, different computer operating systems, different computer drivers, and different computer applications having different means and technologies for representing color and for reproducing color. Operation of a CMS ensures color consistency by transforming an input image from a device-independent and standard color space, such as LAB to a device-dependent color space, such as RGB or CMYK so that the exchange of color between different members of the computer system will be accurate. The standard color space can be a device-independent abstract color space, such as CIEXYZ (XYZ) or CIELAB (LAB).

Of all the visible colors that exist, most color printers only display/reproduce a small subset of these colors. This small color subset that can be reproduced by a printer is called the printer's color gamut, or more simply gamut. An essential function of a CMS is device gamut mapping or matching, and the adjustment of colors from one device gamut for reproduction on a second and different device, so that the output of the second device will look as close to the original as possible.

In order for a CMS to transform data to or from a standard color space from or to a device-specific color space, the CMS requires characterization data for that device. This characterization data is commonly referred to as the device's color profile, printer profile, or more simply profile. A device color profile represents an ideal for a class of devices. Since the state of a color device can change with time, and can change from one device to another within the same class, devices must be calibrated with respect to their ideal. Calibration is, therefore, characterization at a particular instant for a particular device.

Implementation of a CMS can be classified in at least two ways. The first classification is to divide the color management systems as device-dependent or device-independent.

A device-dependent CMS performs pair wise transformation between a source color space and a destination color space. In a device-dependent CMS, pair wise transformations between each and every device is necessary. This is shown by considering color management between a RGB color monitor, a RGB color scanner, and a CMYK color printer. A disadvantage is a limited ability in a distributed production environment to interchange data, since printing at a remote location requires a pair wise transformation that includes the remote printer.

Figures 6, 7:
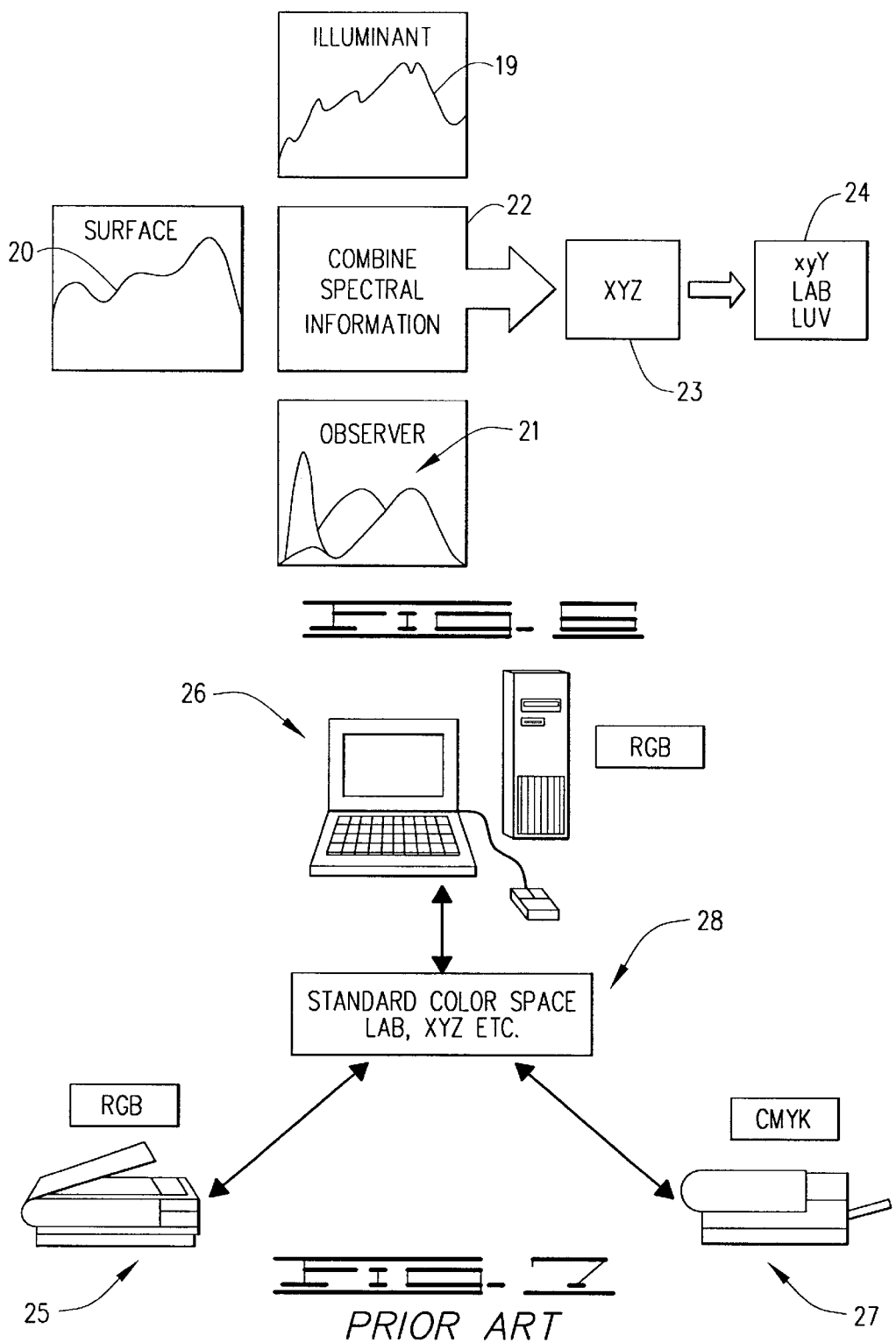
FIG. 6 represents the manner in which the characteristic curve of an illuminant source, the characteristic curve of a surface that contains a printed image, and the characteristic curves of the eye's tristumulus curves can be combined to produce XYZ, xyY, LAB and/or LUV color spaces.
FIG. 7 shows a conventional device-independent color management system used in a computer system that comprises a personal computer and its RGB color monitor, an RGB color scanner, and a CMYK color printer.

In a device-independent CMS scenario, one of the source/destination colors is always in standard color space; for example, XYZ or LAB. Although two conversions are necessary (source to standard, standard to destination), these two transformations can be concatenated and performed when necessary prior to producing an output. The device-independent model is illustrated in FIG. 7 for a RGB color scanner 25, a RGB color monitor and its personal computer 26, a CMYK color printer 27, and a standard color space 28. In this FIG. 7 model, the change of a device, or the introduction of a new device, only requires the device color profile and the transformation from/to standard space for that device.

A second classification of CMS is based on where in the system the CMS functions are implemented; that is, at the application level, at the operating system level, or at the device level. Many present day image editing and page layout software are capable of performing Color Management, either independently or with the use of plug-in modules. One example of an image editing program with built-in color management functions is Adobe Photoshop. Similarly, examples of CMS are the Kodak Precision Input Color Characterization Software (PICC) and the Agfa Fototune. These are examples of application level color management. The color management functions built into the Microsoft Windows 95 Image Color Matching Program and the functions provided to the operating system by Apple's Colorsync are two examples of operating system level color management. The color management functions built into the postscript language enable device-level color management. Color management solutions at the application level include software, such as Adobe Photoshop, Kodak CMS and Agfa Fototune. PhotoShop allows the user to view the out of gamut colors, preview the output and perform color matching using custom color tables. Kodak CMS, and Agfa Fototune are specialized color management systems that can generate profiles for monitors and scanners and perform color matching.

There are several CMS's in the marketplace today. The most popular ones are Apple's ColorSync, Monaco System's Monaco Color, Kodak's CMS Daystar, Digital's Colormatch, Agfa Fototune, EFI's Colorworks1, and Candela's ColorSynergy. All except Apples Colorsync and Daystar Colormatch provide procedures for scanner characterization using IT8, or modified IT8 targets. Kodak's CMS, Daystar Colormatch are compatible with Calorimeter 24 for monitor characterization. Agfa Fototune and EFI Color provide standard monitor profiles that cannot be modified. Monaco Color assumes monitors are perfectly calibrated.

None of the existing CMSs have characterization/calibration procedures for printers, except for ColorSynergy. Some provide Adobe Photoshop compatible CMYK separation tables for various types of proofing devices (including inkjets, thermal wax, xerographic and dye sublimation printers), standard presses, and digital copiers.

All except Apple's ColorSync provide plug ins for Adobe Photoshop and for Quark Xpress. These plug ins control transformation from scanner space to monitor space before the image is input to Photoshop, and from monitor space to printer space as the image is output from Photoshop or Quark Xpress.

Device Profiles

Color device profiles, or more simply device profiles, provide information to CMS that enables CMS to convert color information from a device-dependent color space to a device-independent color space, or visa versa. The ICC specification divides color spaces into three main classes: Input devices, display devices and output devices. For each class, a series of base algorithmic models are described which perform the transformation between color spaces.

One of the first decisions made by the ICC was that color space transformations were the responsibility of the operating system. The ICC did not mandate a specific operating system, nor a single operating system architecture. It did, however, provide an overview of one possible architecture. Within the operating system, a Color Management Framework (CMF) is designated, as shown in FIG. 8. This CMF is responsible for the most important color management functions of the operating system. The CMF provides an interface to the various color management methods, and these methods are the heart of the CMS performing the conversion of image data into the special color spaces of the output devices.

An ICC profile structure, as illustrated in FIG. 9, is defined as a header 29, followed by a tag table 30, followed by a series of tagged elements 31 that can be accessed randomly and individually. This collection of tagged elements 31 provide levels of information for CMS developers, such as required data, optional data, and private data. Tag table 30 provides a table of contents for the tagged information within each individual profile. Tag table 30 includes a tag signature, a beginning address offset, and the size of the data for each individual tagged element. Signatures are defined as a four-byte character. This device profile scheme allows developers to read in tag table 30, and then randomly access and load into memory only information that is necessary to their particular software application. Since some instances of ICC profiles can be quite large, a significant savings in memory and performance is provided. The required tagged elements 31 provide a complete set of information necessary for the default CMF of FIG. 8 to translate color information. Each profile class determines which combination of tagged elements 31 is required. In addition to the required tagged elements 31 for each device profile, a number of optional tagged elements are defined that can be used for enhanced color transformations. Examples of these tagged elements include PostScript Level 2 support, calibration support, and others. Private data tagged elements allow CMS developers to add proprietary functions to their device profiles. By registering just the tag signature and the tag type signature, developers are assured of maintaining their proprietary advantages, while maintaining compatibility with the ICC industry standard.

One of the first steps in device profile generation involves measuring the colorimetry of a set of color patches that are provided from an imaging media, a color display, or a color copier. In accordance with this invention, 182, 150 or 101 different patches, all being of a different color, are printed using a CMYK color printer.

For example, in order to build a color printer profile lookup table, a set of evenly-distributed RGB or CMYK patches are printed. These patches are then measured to provide colormetric data. Different printer vendors use a different member of test color patches. Several printer vendors use the IT8.7 Standard image, containing 190 color patches, while other printer vendors use test images having 4500 patches.

A computer code named ICC-PGS was developed to create and read ICC device profiles. Existing ICC profiles for any printer device can be read by using the bin2txt command. This allows the profile information to be viewed in ASCII format. The generated ASCII text file can then be manipulated using a text editor. Once a device profile is changed, or created, in ASCII mode, an ICC profile can be generated using the txt2bin command. ICC-PGS is written in the C-language, and is compiled using the IBM C compiler on a RS6000 IBM workstation. ICC-PGS comes with the source codes bin2txt.c, txt2bin.c and the header file icc.h which must be present when the cod is compiled. Both txt2bin.c and bintxt are very similar in structure, since one converts text to binary and the other converts binary to text. For bin2txt.c, the main functions called are: IcReadHeader reads the header information from a ICC profile into memory and then writes it to the output ASCII file, IcReadTagTable reads the tag table information into memory and writes it to the output file in ASCII format, IcReadTagData reads the current tagged element, and identifies its type (lookup table, transformation matrix, etc.). Then it calls the appropriate function that reads in the data and writes it to the output file in ASCII format. These special functions are:

IcReadProfileDesc, IcReadLUT, IcReadLUT8, IcReadLUT16, IcReadXYZ, IcReadText. In addition, there are several functions that are used throughout the code to perform number conversions, or to read special information. For txt2bin, the main functions called are: IcWriteHeader reads the header information in the ASCII file into memory and the write it to the output file in binary form, IdReadTagCount reads through the input ASCII file and determines how many tags exist in order to reserve space for the tag table. IcWriteTagData first reads through the input ASCII file and determines the type of the current tagged element, then calls the appropriate special function to writer the information to the output in binary form. The special functions are: IcWriteProfileDesc, IcWriteLUT, IcWriteLUT8, IcWriteLUT16, IcWriteXYZ, IcWriteTagTable reads in tag table information into memory and then writes it to the output file in binary form.

Printer Gamut

Printer gamut, or more simply gamut, visualization allows a printer developer to see the range of colors that a color printer is able to reproduce, and to make improvements to dye/pigment when a larger printer gamut is desired. Device-independent color spaces, such as XYZ, xyY, Luv and Lab are typically used for visualizing gamuts. Only the xyY color space gives a simple 2D representation, while the other color spaces represent gamuts as 3D solids.

For example, in FIG. 5, a printer gamut would appear as a 3D solid that encompasses the three orthogonal axes that are shown in FIG. 5. The printer to which this 3D gamut relates can reproduce any color whose coordinates are within this 3D solid, or are on the surface of this 3D solid. When this printer is requested to print a given color, the LAB value of the requested color is used to fetch a corresponding CMYK value from a profile lookup table that corresponds to this printer. When the requested color is in-gamut, this fetched CMYK value results in the printer accurately reproducing the requested color. When the requested color is out of gamut, then the fetched CMYK value that is provided by the lookup table results in the printer printing an in-gamut color that most closely matches the requested color.

Figure 3:
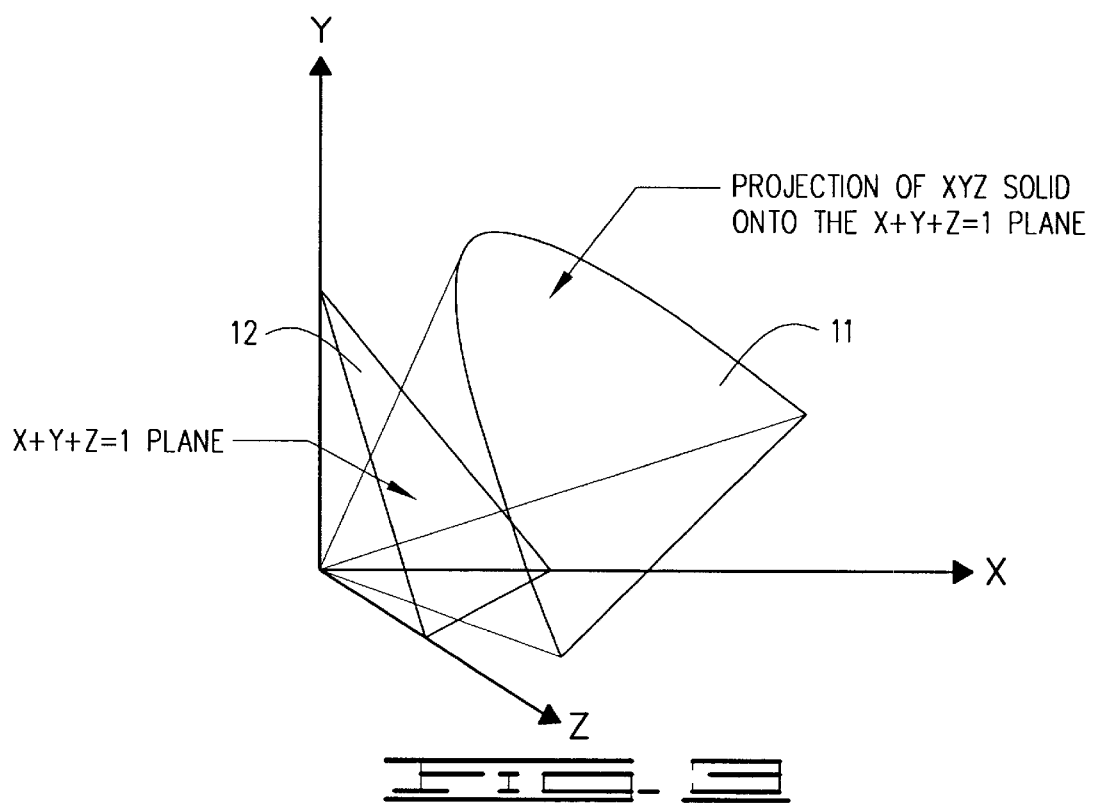
FIG. 3 shows a three-dimensional XYZ color space.

The xy chromaticity coordinates of FIG. 4, obtained from normalizing the tristimulus values XYZ of FIG. 3, provides a 2D representation of any color, ignoring the lightness component of the color stimulus. Since the lightness information is not represented, the xy chromtaicity coordinates only provide information related to hue and saturation. On certain occasions, this type of information is very useful, even though it does not give a complete description of the color. In order to visualize the gamut of a color printer, equally color spaced CMYK color patches are printed and then measured using a colorimeter or spectrophotometer. The resulting data can then be plotted in xy chromaticity coordinates.

Figure 11:
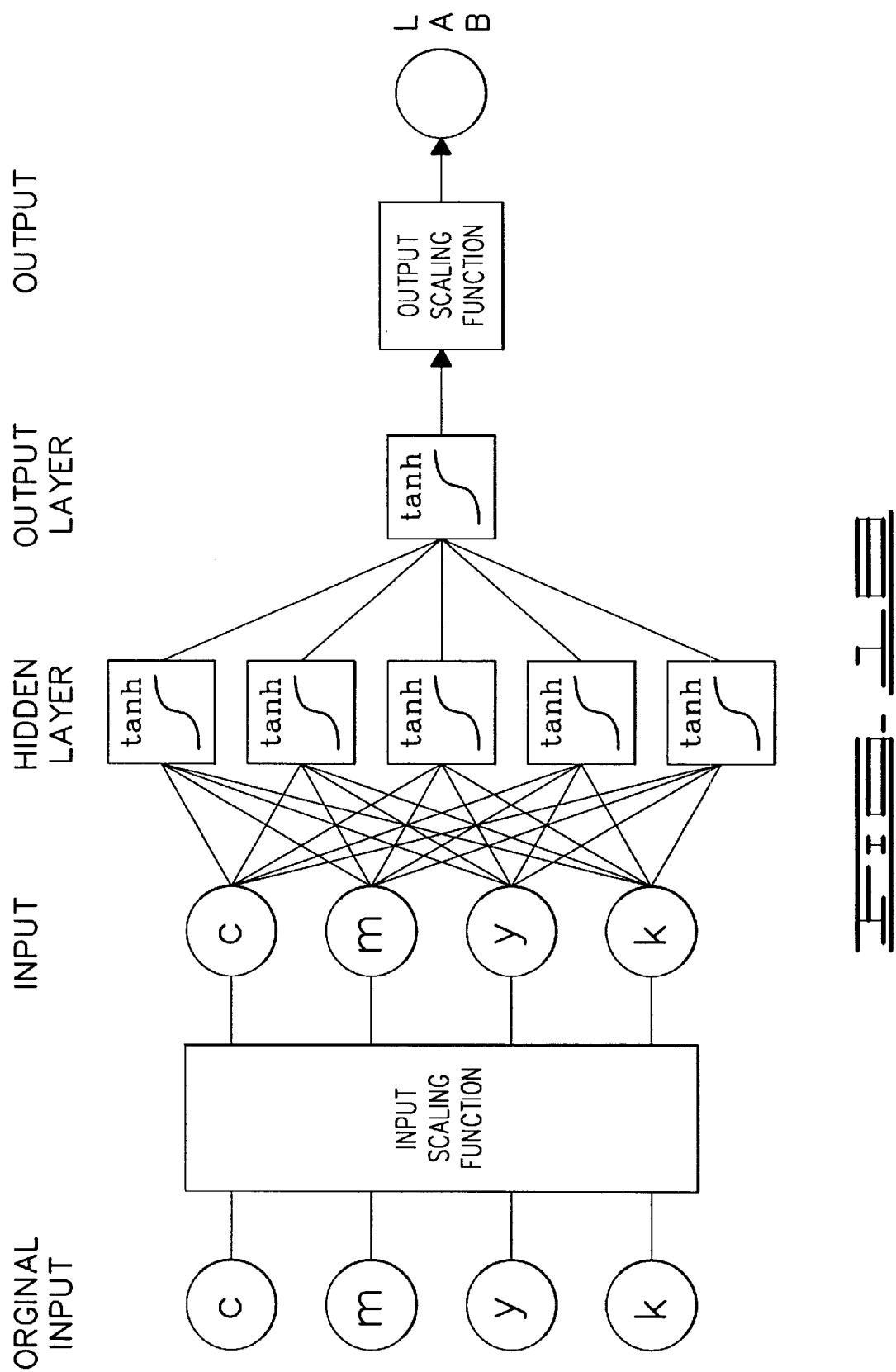
FIG. 11 shows a color gamut comparison of an IBM color printer, a Tektronix color printer, and a Sony color display in chromaticity coordinates.

FIG. 10 shows 81 color patch measurements for a commercially available color printer. Connecting the points that represent the six colors RGBCMY provides a good representation of this printer's gamut boundary. If the xy chromaticity coordinates of two colors are known, then any color that is obtained from their mixture is positioned on the line that connects these two colors. Printer inks (toners) tend to mix in a non-linear manner that depends on the type of ink and the particular printing technology. Color monitors, on the other hand, mix colors in an approximately linear fashion, and their gamut boundary can, therefore, be represented by only three lines that connect the xy values of the R, G and B primaries. FIG. 11 shows the three device gamuts of a Tektronix color printer, an IBM color printer, and a Sony color monitor. From FIG. 11 it is seen that monitors reproduce a wider range of blue colors, while printers have an advantage in the green region.

The most accurate and intuitive method for visualizing a printer gamut is by using the LUV or LAB color space. The only disadvantage in this method is that it has three dimensions; therefore, specialized software is needed in order to visualize all possible views of a particular 3D gamut solid wherein any color whose coordinates are contained within the solid, or are contained on the surface of the solid, can be printed by the printer. Unlike the xy chromaticity coordinates of FIGS. 10 and 11, the LAB color space also provides lightness information, thereby completely describing any color.

Gamut 1.0 software provides a versatile and user-friendly tool for 3D color gamut visualization. The user provides a data file that contains the CMYK and the corresponding LAB values for each measured color patch, and the software displays them in 3D space. The user can then manipulate the gamut by zooming in, zooming out, and rotating the 3D space in any way that is desired. In addition, a second device gamut can be loaded and displayed in conjunction with the first.

Gamut 1.0 is written using C++ and the Microsoft Foundation Classes (MFC). The OpenGL graphics library is used for generating the 3D graphics and performing geometrical manipulations. The software was compiled on a 200 Mhz IBM-compatible PC, using the Microsoft Visual C++ compiler. The program can run on any PC based computer, with 16-megabytes of RAM or more, and a graphics card that can support 24-bit color.

The first step in displaying a device gamut using Gamut 1.0 is to load the device profile data from an ASCII file. Each line of the ASCII text includes the CMYK or CMY percentage of the particular data point, followed by its Lab values. The load menu option allows the user to select a primary and secondary gamut file. The primary gamut file points are colored, and the secondary gamut file points are gray in order to make comparisons easier. The view option allows background color selection, as well as turning on and turning off of the gamut bounding box and gamut points. The manipulation menu option includes various geometrical transformation commands, such as full rotation and rotation about a specific axis. Finally, a toolbar allows the user to rotate, zoom in and out, and change the point size.

In color gamut mapping, gamut mismatch occurs when the input gamuts and the output gamuts of an imaging system do not coincide. Gamut mapping describes a technique that maps an out of gamut color to the best possible color that is within an output device's gamut, and is thus reproducible by the output device. This is done by minimizing the color difference between the two gamuts. Gamut mismatch is usually a problem that is encountered when color images that are generated on a monitor are to be printed on a four color CMYK printer.

Relative to selecting a device-independent color space, the first step in solving a gamut mapping problem is to select a device-independent color space that accurately accounts for differences in human viewing conditions. In addition, the selected color space should be perceptually uniform and should allow features, such as chroma, hue and lightness to be manipulated independently. The CIE 1976 LAB and the CIE 1976 LUV color spaces are the most popular choices.

It has been noted that gamut mapping is application dependent. Pictorial images and computer generated imagery usually require different gamut mapping algorithms for optimal results. For pictorial images, the colors are expected to remain the same from monitor to printer. On the other hand, business presentations usually require colors to maintain their saturation. Color management systems typically provide a rendering intent option in order to obtain the best results possible.

Device characterization implies that accurate color space conversion models need to be developed for the input and the output device. This is done by measuring a large number of color patches, creating profile lookup tables, and finally using interpolation algorithms to map colors from one device to the other. One of the most challenging parts of the interpolation based techniques is defining the boundaries of the output device. One methodology is using cell structures to determine the closest point on the output device's gamut.

Mapping algorithms are typically classified as either clipping or compression algorithms. For any given out of gamut color, clipping algorithms usually find the closest in-gamut point by minimizing ΔE. This method is usually very effective, although in certain cases, many different out of gamut colors are mapped to the same in-gamut color, thus creating a block effect. Clipping algorithms can be enhanced by posing constraints, such as constant hue angle or constant saturation. Compression algorithms, on the other hand, compress the gamut of the input device in order to fit the input gamut inside of the output device's gamut. These methods typically compress the lightness component first, and then the chroma.

In gray component replacement, when the three primary colors CMY are used in color printing, black can be generated by printing equal amounts of cyan, magenta, and yellow. The resulting black color is closer to a muddy brown than it is to black, due to imperfections in the color pigments. Further, the relatively large quantity of CMY ink that is necessary to produce dark colors may make the paper wet, thus increasing its drying time. Generally, four color CMY printing aims to substitute a certain amount of black ink for the CMY inks, thus reducing the total quantity of ink that is required.

Gamut and Gray Component Replacement:

The present invention approaches gamut mapping and gray component replacement from a new and an unusual perspective. Traditionally, color matching has been a two-step process. First, input colors were mapped onto the output gamut using lookup tables that converted LAB values to CMY percentages. Then, an Under Color Removal (UCR) algorithm sometimes coupled with an Under Color Addition (UCA) algorithm was employed to substitute a CMY combination with a corresponding CMYK. By only measuring combinations of CMY percentages, the total number of measurements was reduced considerably. Even when the first step was performed accurately, the second step usually introduced considerable error, since non-linearity is introduced when black ink is mixed with the CMY inks.

The present invention performs gamut mapping and gray component replacement in one step using neural networks for color space conversion, and using optimization methods for selecting the most appropriate combination of CMYK for a given set of LAB values.

An important feature of the present invention is that instead of using large interpolation tables, accurately trained neural network functions are used that require only a relatively small number of color patch measurements. This approach is an improvement over other techniques, since it reduces the total number of measurements that are required, this being extremely important when quick printer characterization and calibration is needed. In addition, neural networks are well defined functions that can be differentiated for use with any derivative based optimization routine.

Figure 20:
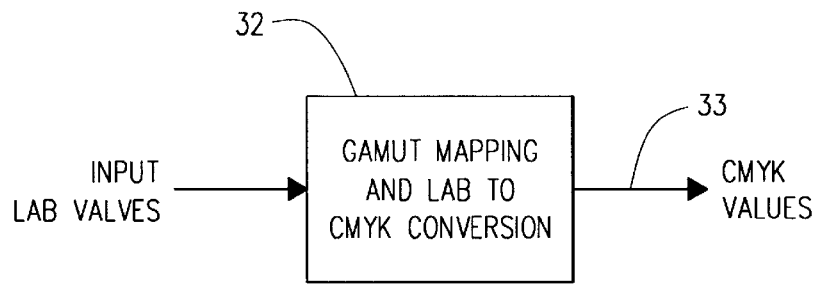
FIG. 20 is a simplified showing of the one step color management process of the present invention.
Figure 21:
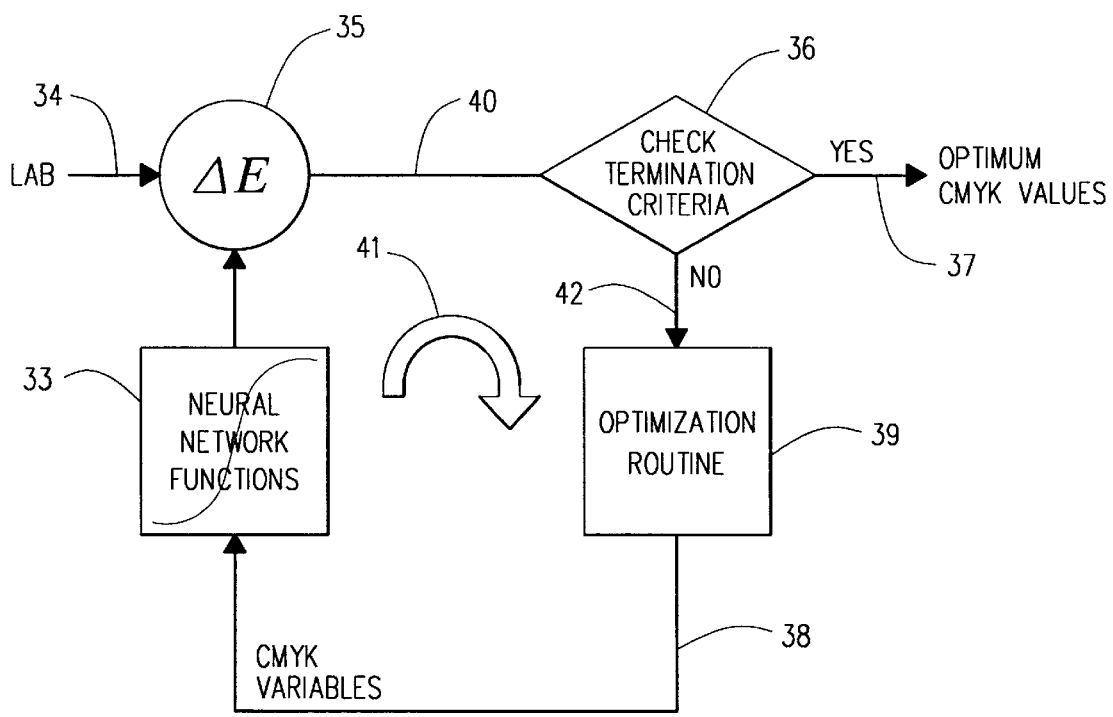
FIG. 21 is a more detailed showing of the present invention.

FIGS. 20 and 21 show the one-step process of this invention whereby a profile lookup table for a CMYK color printer is constructed, and wherein this lookup table generation is accomplished using a gamut trained neural network that provides CMYK output values for any combination of input LAB colors, including a function that determines the amount of black ink that is to be used in the CMYK output values, and including an optimization routine that minimizes the sum of the input LAB to feedback LAB error and the weighted total ink.

With reference to FIG. 20, gamut mapping and LAB to CMYK conversion takes place at the single step 32 whose output 33 comprises a CMYK value that is the best trade off between ink cost and color accuracy; i.e., between total ink and color error.

Figure 16:
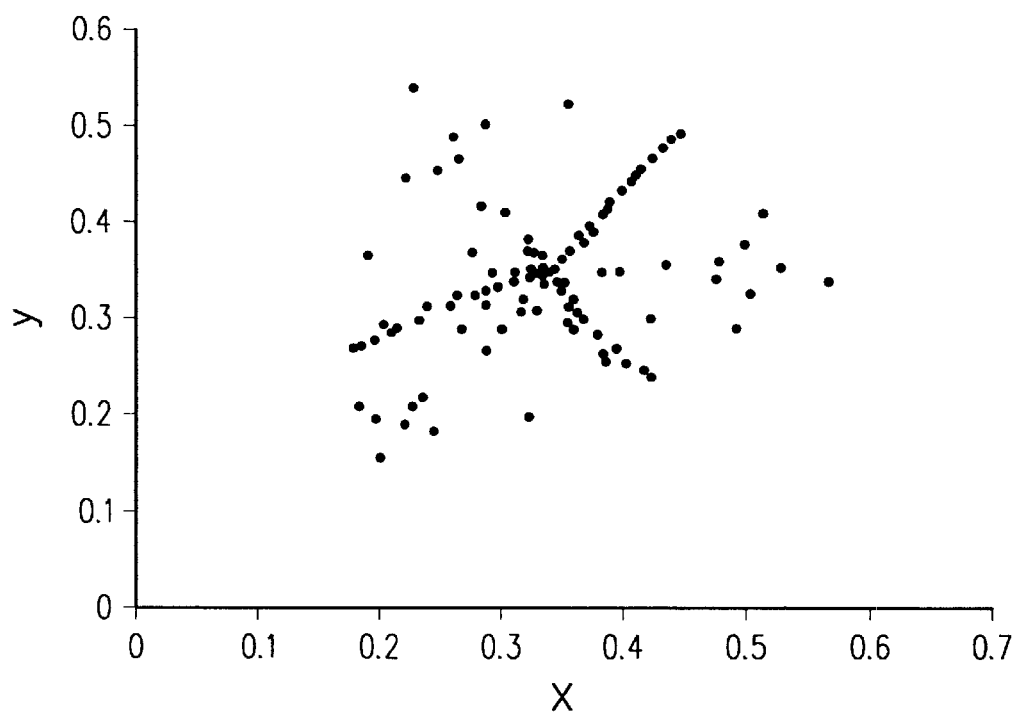
FIG. 16 shows an ANSI basic data set in xy chromaticity coordinates.

With reference to FIG. 21, a gamut trained neural network 33 is shown. Network 33 is trained using a well-known optimization routine whose input comprises the relatively small number of data points, such as the 182 data points that are defined by ANSI IT8.7/3 and as shown in FIG. 16. Fewer data points (for example, either 150 or 101 data points) have also been used in embodiments of the invention. These fewer data points are selected by removing redundant data points in linear regions of the printer's gamut, and possibly by also adding data points only where non-linearities were present, this typically being data points where black ink is mixed with the other primaries; namely, CMY and RGB obtained as combinations of any two colors of CMY. In accordance with a feature of the invention, neural network 33 preferably comprises from 5 to 7 neurons.

In the arrangement of FIG. 21, LAB color space values 34 are supplied to an error determining junction 35. For in-gamut LAB values 34, an error termination criteria of generally zero error is set, as specified by function 36. When function 36 is satisfied, an output 37 is supplied. In one embodiment of the invention, output 37 is applied to a printer profile lookup table, this entry correlating the CMYK value that is then on conductor 38 to the LAB value that is then on conductor 34. In another embodiment of the invention, the CMYK value that is then on conductor 38 is used to create one color pixel of an image corresponding to the LAB value that is then on conductor 34.

When function 36 is not satisfied, i.e. when the error on conductor 40 is too high, the NO output 42 of function 36 provides an error input to optimization routine 39, whereupon the CMYK value on conductor 38 is changed, i.e., incremented. This new CMYK value on conductor 38 is now compared to the LAB value on conductor 34, and a new error output is provided on conductor 40. This new error output 40 is again tested by function 36. This process then repeats, as indicated at 41, until such time as function 36 is satisfied and a YES output is generated on output conductor 37.

Figures 27, 28:
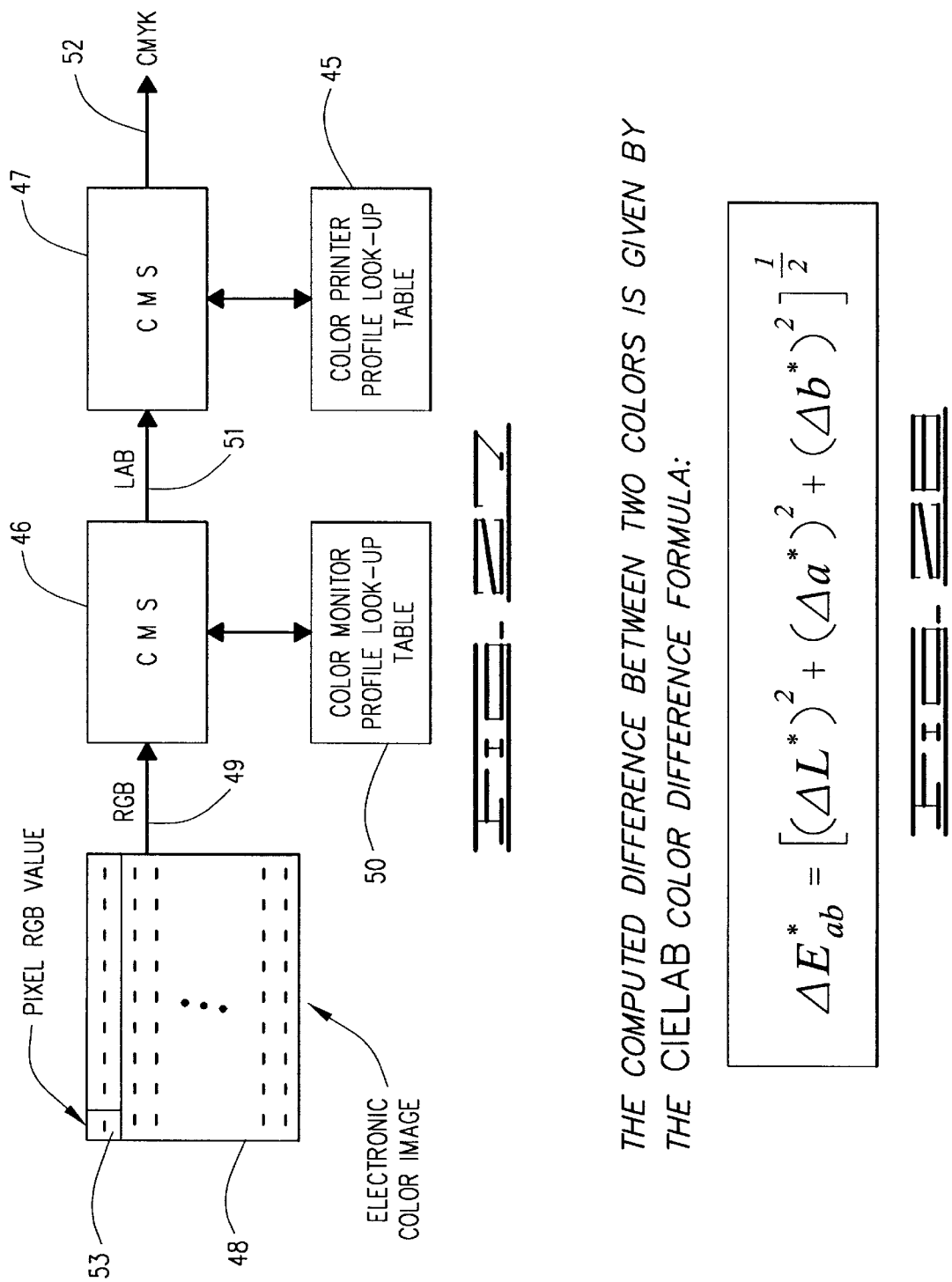
FIG. 27 shows a computer system example of a first embodiment of this invention wherein a color printer profile table is provided.
FIG. 28 shows the function that is implemented by the error determining junction shown in FIG. 21.

FIG. 28 shows, by way of example, a well-known CIELAB difference formula that is implemented by junction 35 of FIG. 21.

Neural network 33 is trained in accordance with the gamut of the printer for which a profile is being generated by output 37 of FIG. 21. When the LAB value on conductor 34 is within the printer's gamut, the error on conductor 40 can be driven to zero by repetitions 41. When the LAB value on conductor 34 is not within the printer's gamut, the error on conductor 40 is minimized by repetitions 41, and the resulting correlation of that out of gamut LAB value 34 is correlated to a CMYK value is within the printer's gamut, and is the closest in-gamut color that can be found relative to this out of gamut LAB value 34.

Termination criteria 36 operates to check the accuracy to which a current CMYK value 38 satisfies a minimum of the following overall optimization formula $$\text{minimize} = C1(\text{error } 40) + C2(C+M+Y+K) - C3(K)$$

where

C1, C2 and C3 are constants in the range 0 to 1, and subject to C+M+Y+K (i.e., the total quantity of ink within current CMYK value 38) being equal to or less than a total ink maximum value, and subject to error 40 being equal to or less than a maximum defined error value.

In general, for different rendering intents, such as an intent for accurate reproduction of a color image or an intent for the reproduction of a business presentation without the need for accurate color reproduction, the objective functions minimized in the above optimization formula can be changed. Also, if the total ink term "C+M+Y+K" equals 4, then there is no limit to the amount of ink that can be used to reproduce a given color pixel. The value of constants C1, C2 and C3 in the range 0 to 1 determines the relative importance that is assigned by the user to each of the two criteria of color accuracy and ink cost. Minimizing the total ink, i. e. minimizing the C+M+Y+K term, and maximizing the black or K ink component presents two alternative strategies to achieve a minimum ink cost, while minimization of error 40 enhances color accuracy.

Figure 22:
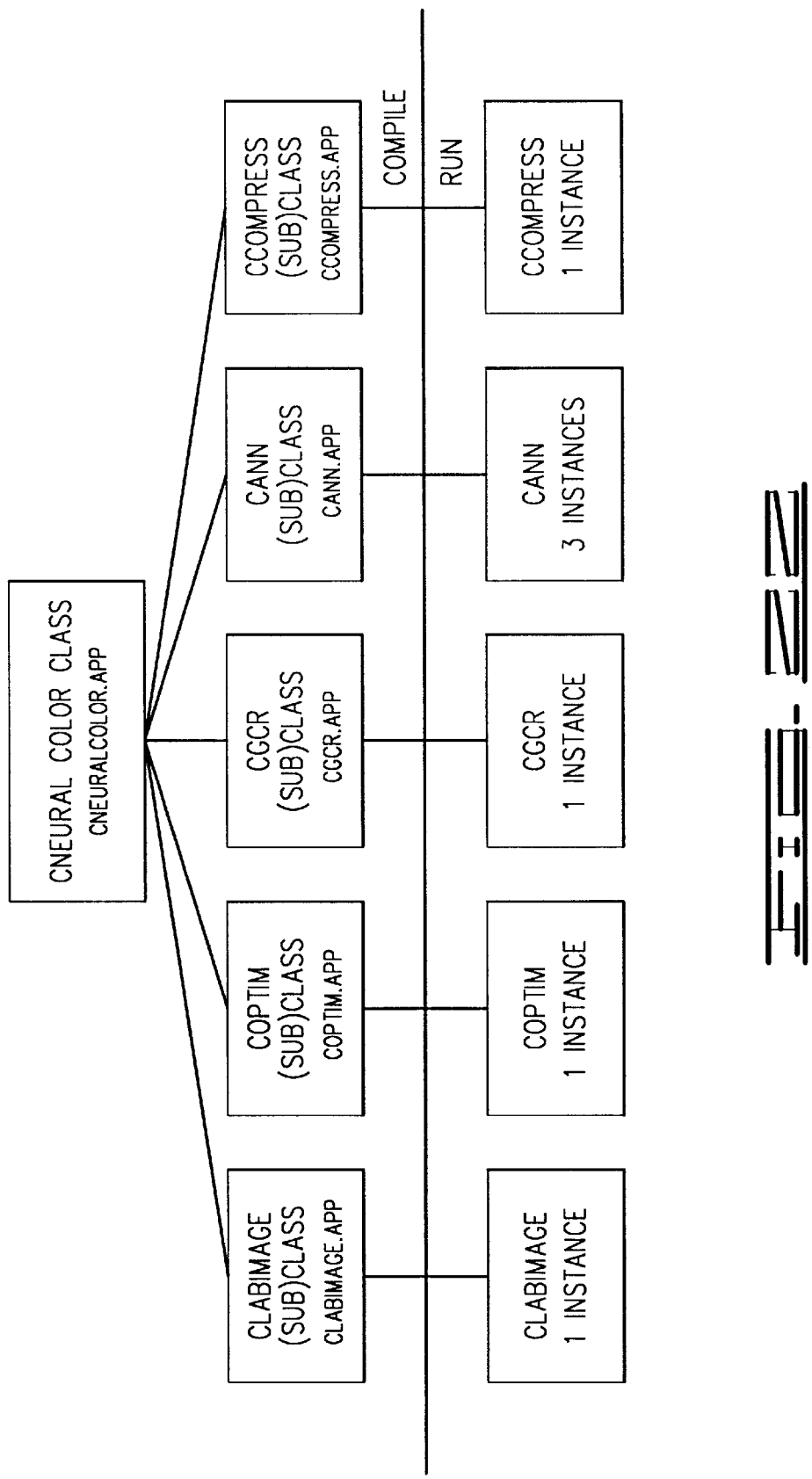
FIG. 22 shows the class architecture of a program that implements a neural network in accordance with the present invention.

Training of neural network 33 in accordance with a plurality of one of the color patches that are made by a printer is well known in the art. With reference to FIG. 22, the main object entity of an object based computer program that accomplishes this training function is a member of the CneuralColor class, and it contains 5 subclasses. Once the CneuralColor class is created, it creates the other five objects and performs initialization tasks.

Relative to FIG. 22, the Clabimage class reads baseline TIFF LAB files without compression, and this class performs the following tasks: Decodes the TIFF LAB file; Extracts the LAB value of each pixel; Determines the total number of pixels; Stores the LAB values in a CneuralColor member array; Exports the optimized CMYK to a TIFF CMYK file.

FIG. 22 Cann class is used for performing color space conversion and is trained and tested using Neural1.0. This class performs the following tasks: Reads .ann files generated by Neural 1.0; Evaluates LAB values for any CMYK percentage by performing a forward pass through the neural networks; Analytically evaluates the gradients of the LAB output with respect to the input variables CMYK.

Since the weight (w) and bias (b) information for the neural network functions are read from a file and are not directly coded into the program, one can retrain the networks at any time, and the color space conversion process can be updated by replacing the old ann files with updated ann files.

Relative to FIG. 22 Cgcr class, it is known that for any LAB color, a non-unique combination of CMYK is available. Therefore, for any input color, an intelligent way of fixing the amount of black is needed. The Cgcr class eliminates the black contribution when the lightness or chroma are large. In addition, the black (K) amount is maximized when the input color is very close to gray, or when the lightness is very low. The function that determines the black amount is called the gray function.

In addition, minimizing total ink (C+M+Y+K) or maximizing the black ink component (K), in the above-stated optimization formula ensures the uniqueness of the resulting CMYK value.

Figure 23:
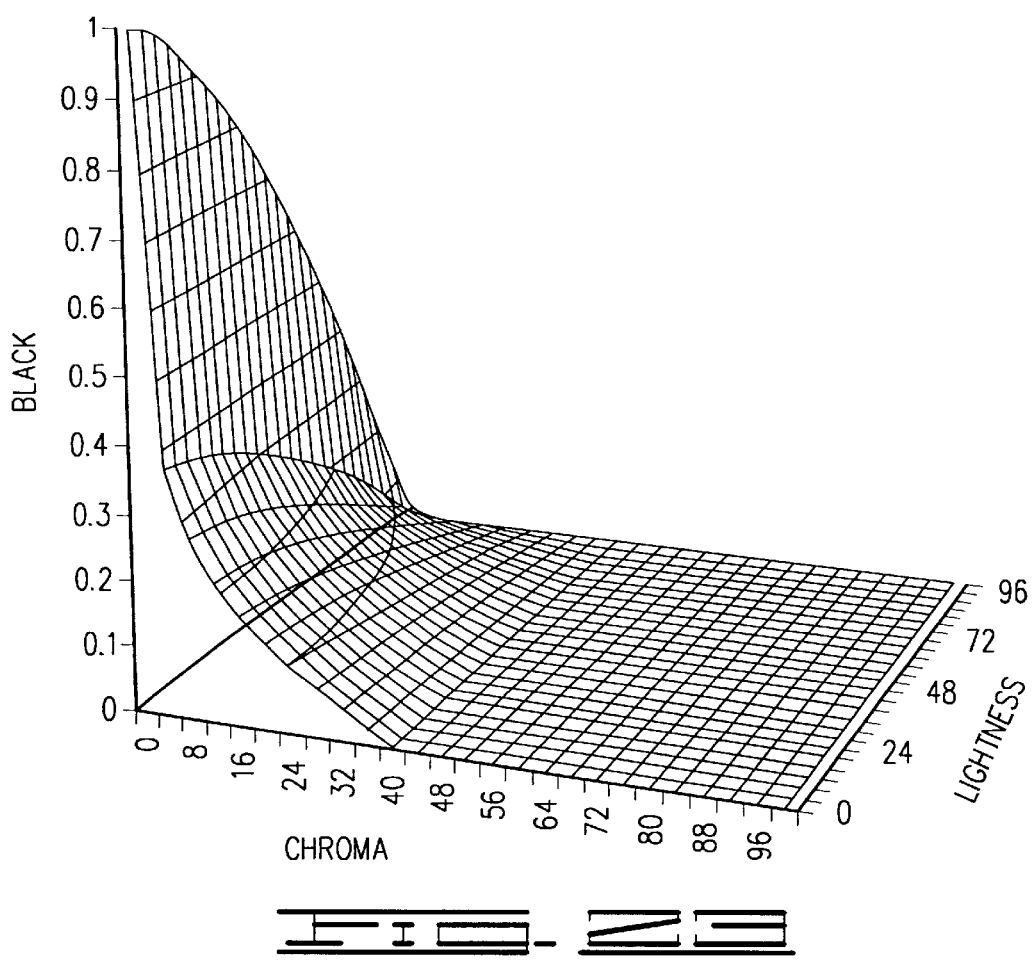
FIG. 23 shows a gray function that is used by the Cgcr class that is shown in FIG. 22, the gray function being shown in chroma, black and lightness coordinates.

FIG. 23 shows a gray function in black, chroma, and lightness coordinates. If a color has a high chroma, the color is saturated, therefore, the gray function goes to zero to prevent black ink content. If the lightness is very high, then again the gray function almost eliminates any black content, even when the chroma value is low. The only disadvantage of the gray function is that the maximum chroma does not depend on hue, which is strictly not true. The FIG. 22 Cgcr uses the FIG. 23 gray function to fix the value of K (black) for any incoming LAB value.

Figure 24:
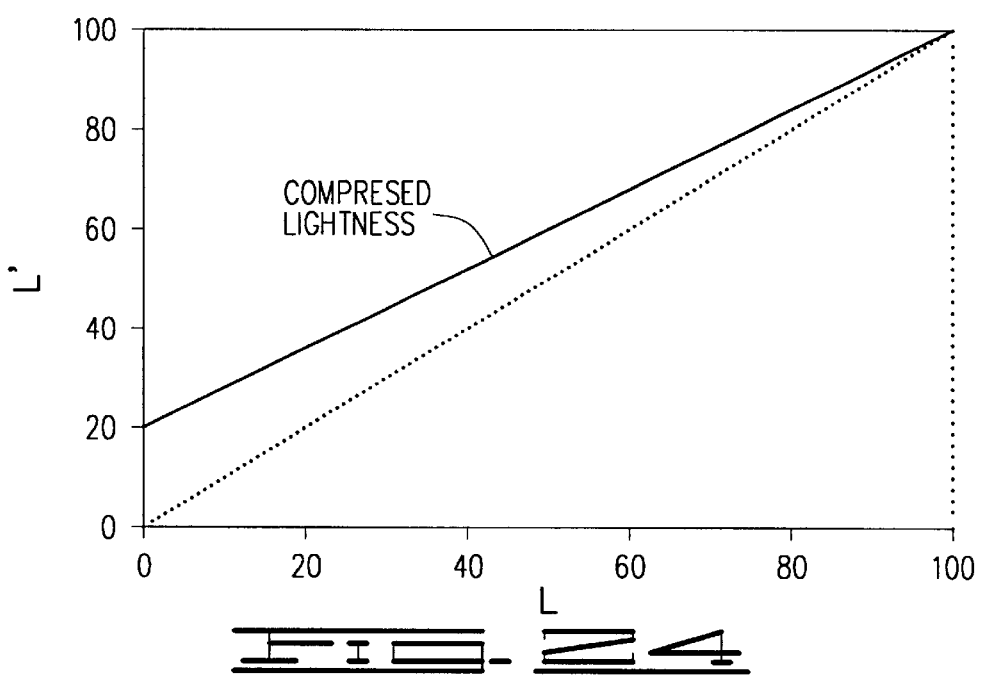
FIG. 24 shows a lightness compression curve, this being a function that is performed by the Ccompress class that is shown in FIG. 22.

Relative to the FIG. 22 Ccompress Class, it is often the case that the lightness of a LAB image varies from 0–100, and the lightness of a printer varies only from 20–100. In this situation, all of the colors within the original image with lightness from 0–20 is mapped to the same lightness value, causing a loss of detail. In this case, the image's LAB values need to be transformed before used by the optimization process. One very convenient solution is to linearly transform the lightness range of the incoming image to the lightness range of the printer. FIG. 24 illustrates one such transformation. The FIG. 22 class called Ccompress performs the FIG. 24 lightness compression to any incoming LAB value.

The optimization routine 39 of FIG. 21 is used to minimize a function of several variables, subject to equality and inequality constraints. The present invention uses a known sequential quadratic programming optimization routine called NLPQL to minimize the color difference between the incoming color and the predicted output from the neural network function. The color difference is usually described by a CIE $\Delta E$ function, see 40 of FIG. 21. The CMYK percentages 38 are changed by optimization routine 39 until the $\Delta E$ function (40 of FIG. 21) described above is minimized. If the input color 34 is inside the printer's gamut, error 40 is zero. If the input color 34 is outside the printer's gamut, the best possible in-gamut solution is found. Constraints are imposed when a variable is fixed, as for instance, the variable being a limit that is placed on the total amount of ink within the CMYK output 37.

The solution to an optimization problem greatly depends on the initial guesses 38 that are provided. Optimization routines, such as NLPQL, guarantee only a local minimum solution. If the initial guesses are far from the optimal solution, the optimization routine may not converge to a meaningful solution. In order to start the optimization routine with a good initial guess, the present invention chooses an initial black (K) using the gray function.

Figure 25B:
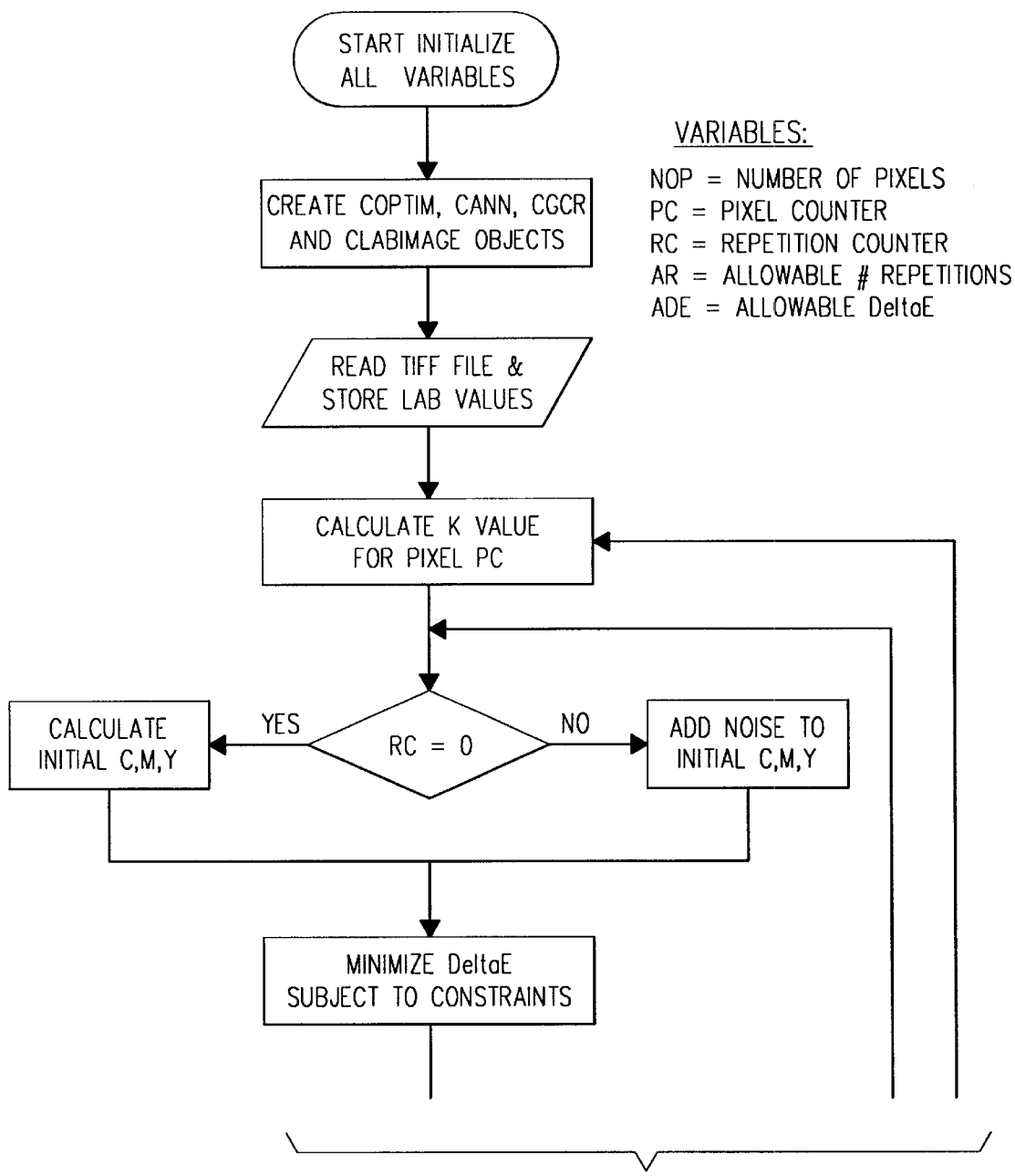
FIG. 25 shows the overall color management system control flow of the present invention.
Figure 25:
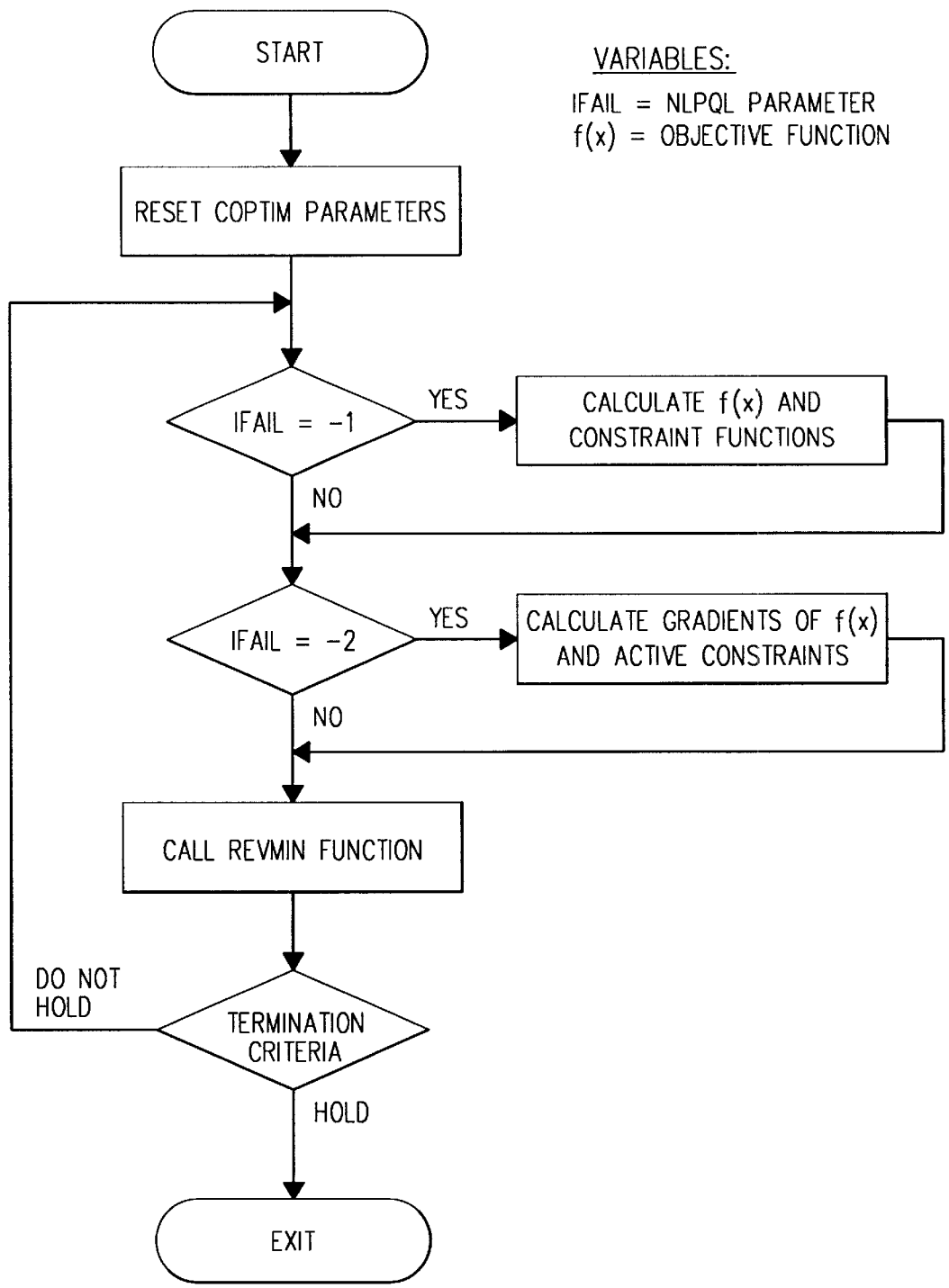

There are cases when an optimization process fails to converge to a minimum even when the initial guess is good. Since this is a real possibility, the optimization process needs to be repeated until the best solution is found. The present invention uses an algorithm that makes the process more robust by checking the value of the objective function and repeating the optimization process (see 41 of FIG. 21) until optimum is reached, as determined by decision network 36 of FIG. 21. For each repetition, noise is added to the initial guess using a random number generator. FIG. 25 illustrates the overall algorithm of this invention.

The above-mentioned optimization routine NLPQL is a FORTRAN subroutine that features: Separate handling of upper and lower bounds on the variables; Reverse communication, Internal scaling; Internal multiplier and Hessian approximation; Feasibility with respect to bounds and linear constraints. In the present invention, NLPQL was translated into C language for use with the remainder of the system.

FIG. 26 shows this reverse communication optimization using the Coptim class of FIG. 22.

Neural Network Training

An Artificial Neural Network, or more simply a neural network, is a network having many very simple processors, each processor possibly having at least a small amount of local memory. These processors are interconnected by unidirectional communication channels that carry numeric data. The processors operate on data that is local to a processor, and on data that the inputs to the processors receive via the connections. A neural network is a processing device, either an algorithm or hardware, whose design is motivated by the design and functioning of the human brain and components thereof. Most neural networks have some sort of training rule whereby the weights of connections are adjusted on the basis of data patterns that are presented to the neural networks. In other words, neural networks learn from examples, and they exhibit some structural capability for generalization. In principle, neural networks can compute any computable function. Anything that can be represented as a mapping between vector spaces can be approximated to arbitrary precision. In practice, neural networks are especially useful for mapping problems which are tolerant of some errors, but to which hard and fast rules cannot easily be applied.

Supervised training uses known examples to train a neural network. For color space conversion, the tristimulus or LAB values for a given set of color patches are provided. In accordance with this invention, a relatively small number of color patches are required, examples being 182, 150 or 101 color patches.

The most popular neural network model for supervised training is called the Multiple Layer Feedforward Network (MLFN). FIG. 12 represents a multi-layer neural network. Circles represent observed variables with their name shown in the circle. Boxes represent values computed as a function of one or more arguments. The symbol inside a box indicates the type of function. Arrows indicate weights(w) and biases (b).

A simple perceptron computes the linear combination of the inputs, called the net input. The calculated value is then passed through a nonlinear activation function to produce the output. An activation function typically maps any real input to a usually bounded range of values. Bounded activation functions are termed squashing functions. Some common activation functions are:

linear or identity: act(x)=x hyperbolic tangent: act(x)=tan h(x)

$$\text{logistic: act}(x) = \frac{1}{1 + e - x}$$

threshold act(x)=0 if x<0, and 1 otherwise.

Figure 13:
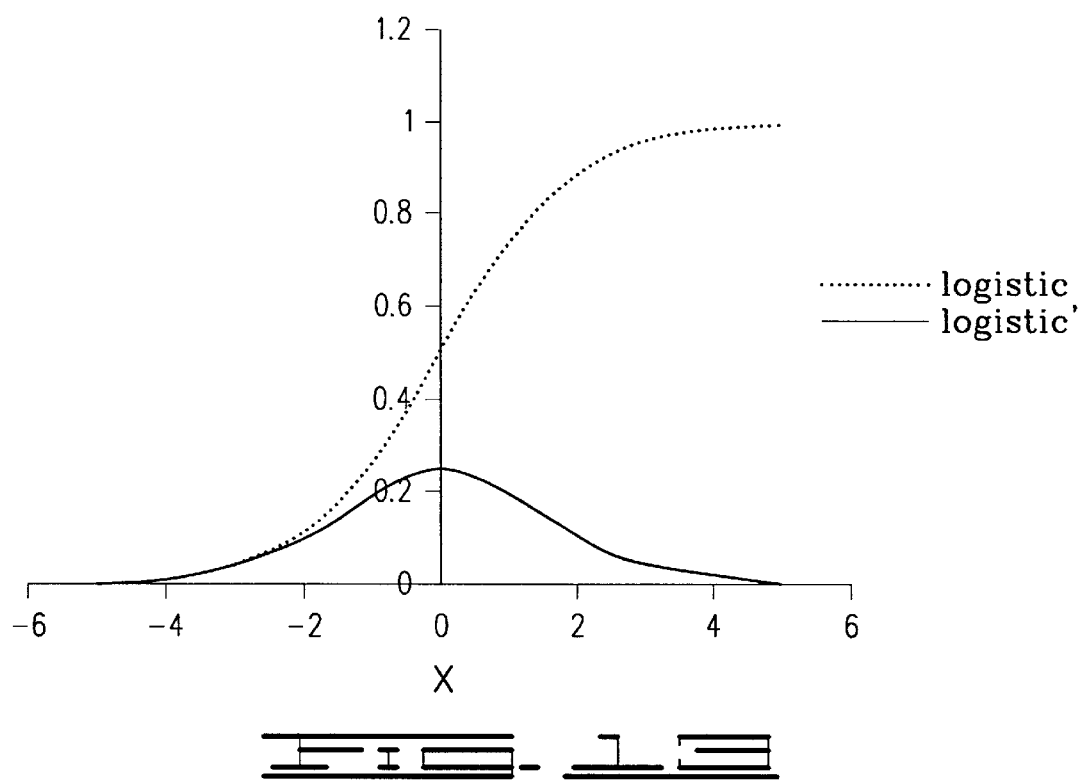
FIGS. 13 and 14, respectively, show a non-linear logistic activation function and a non-linear hyperbolic tangent activation function that provide the neural network of FIG. 12 with the ability to map non-linear relationships.
Figure 14:
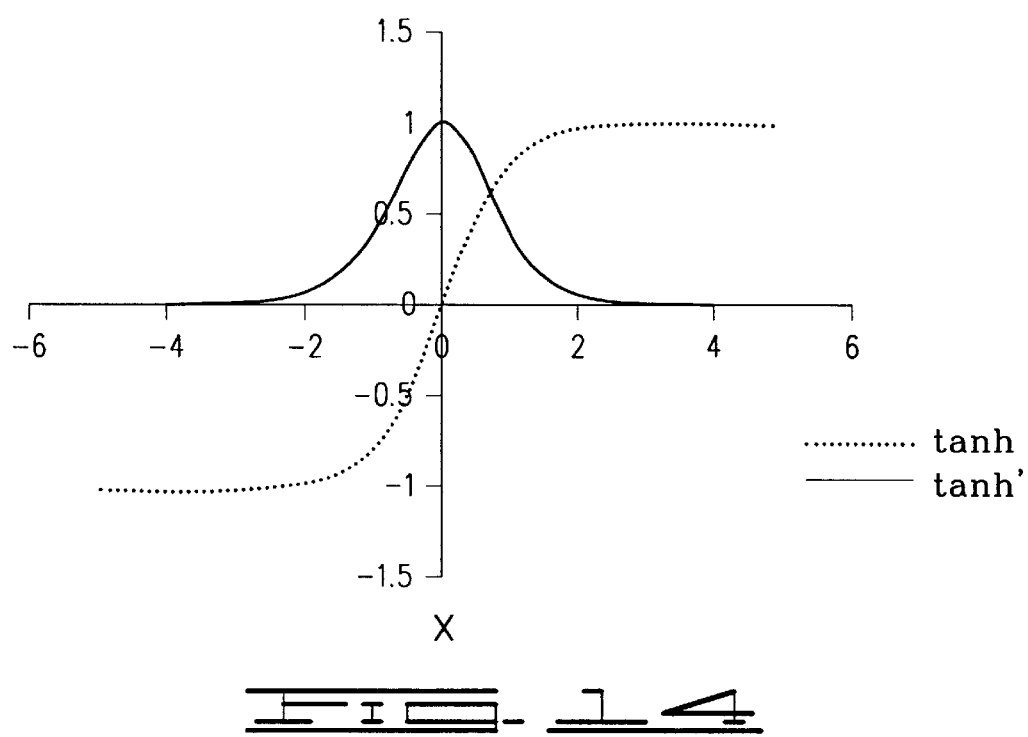

The logistic activation function and the hyperbolic tangent activation function are highly non-linear functions, and they provide the neural network with the ability to map non-linear relationships. FIG. 13 shows the logistic activation function, whereas FIG. 14 shows the hyperbolic tangent activation function. From FIGS. 13 and 14 it can be seen that the logistic function is bounded by 0 and 1, and that the hyperbolic tangent by −1 and 1.

Model evaluation is an important step in developing an acceptable global neural network model for a specific process. The most common measures are multiple correlation coefficient, percentage relative error, and average mean squared error.

Neural networks are trained by finding the best set of weights w and biases b that minimize some measure of the network error. The optimum weights and biases are found by using optimization algorithms that vary the weights w until the error function is less than a pre-selected termination value. There are two main families of optimization algorithms. Deterministic algorithms use explicit, gradient based, formulas to determine each step toward the minimum. In general, these deterministic algorithms require fewer function evaluations in order to converge to the optimal solution. The main disadvantage of deterministic algorithms is that they usually cannot distinguish between local and global minima. If an error function consists of many local minima, a solution may satisfy the optimization criteria, and yet fail to make the neural network accurate. Stochastic algorithms, on the other hand, rely on random searches and, therefore, take longer to complete, although they have a better chance arriving at a global minima.

An important step in solving a problem using neural networks is determining the optimal number of neurons and hidden layers. In addition, the training set selection can influence the end result. The following general rules can be applied for improving results.

The training data set should span the entire input range and every interaction between the inputs should be considered. In some cases, the designer may select more points where increased non-linearity is present, or reduce the number of data points where almost linear behavior is expected. The testing set should not comprise data points used for training the neural network, and should span the entire input range. Only one hidden layer is typically needed to model any process. Multiple prediction is not encouraged since it is almost always better to train separate neural networks for each output. Start with a small number of neurons and increase the number of neurons if training and testing give unsatisfactory results.

Figure 15:
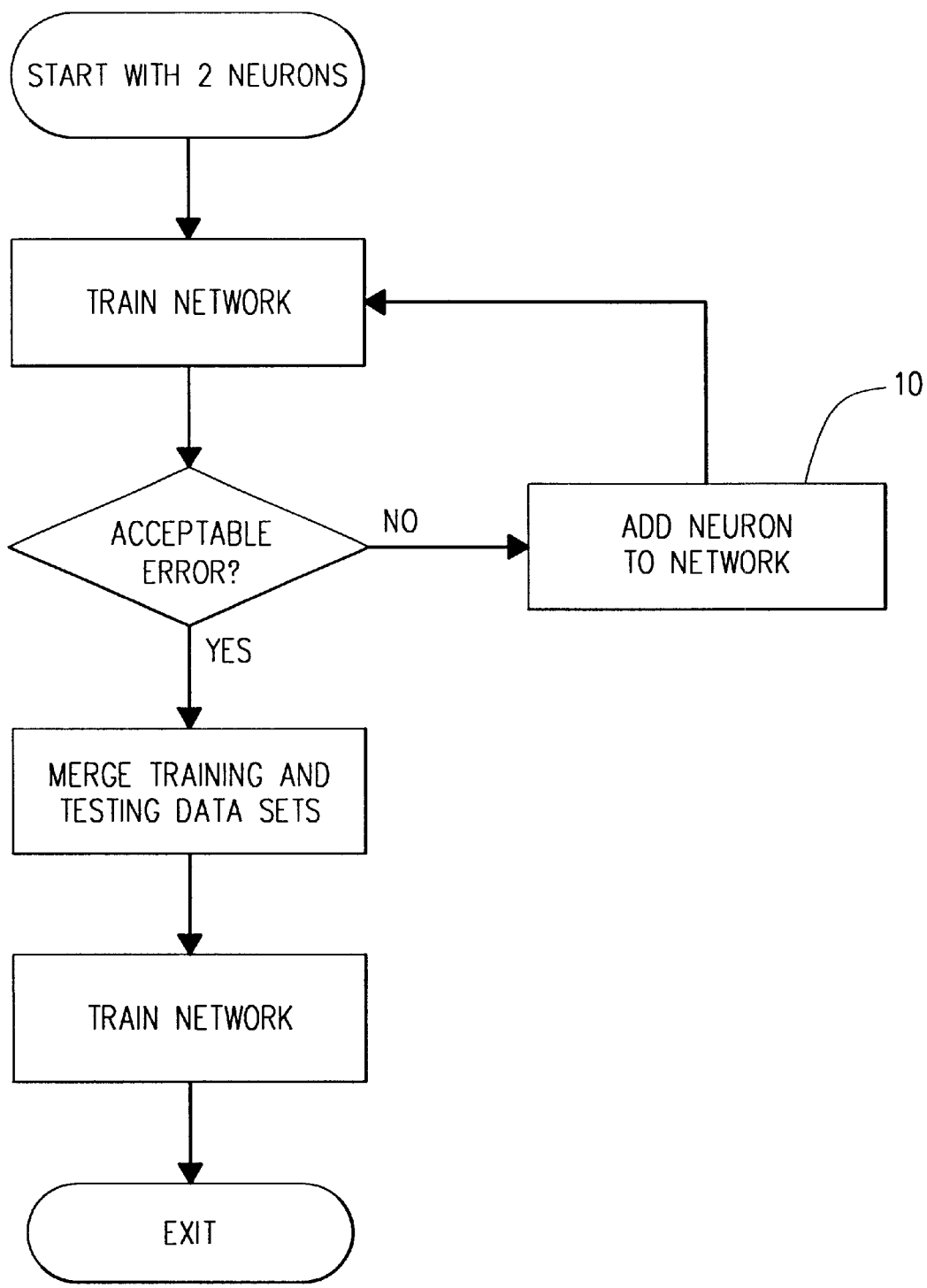
FIG. 15 shows a neural network sizing and training procedure used in accordance with the present invention.

The flowchart in FIG. 15 illustrates the design and training process used in the present invention, one of the features of which is function 10 that provides for adding neurons to a FIG. 12 network.

This invention includes a C++ program that implements a feed forward neural network for performing color space conversions. The C program uses the public domain LMDIF Levernberg-Marqualdt least squares routine, available as part of the MINPACK package. The C program can be used to train a neural network or to use an existing neural network to generate additional data.

To activate the train mode, the user runs the neural executable using the following arguments:

neural−t<name of ann><training data file>

The user is then asked to enter the number of inputs, the number of training data points, and the number of testing points. The data is then read from the selected file, and the data will be scaled to the range of −3.0 to 3.0 which corresponds to the approximate points where the hyperbolic tangent function of FIG. 14 becomes flat. The output values, on the other hand, are scaled to run from −0.9 to 0.9. These values are selected in such a way as to make the minimization process easier. The hyperbolic tangent function of FIG. 14 has a theoretical range of −1.0 to 1.0, although in practice, a reasonable trainable range is −0.9 to 0.9. This scaling procedure also guarantees that the weights w and biases b will not have to be large values, thus making it easier for the minimization routine to find the minimum. The weights w are then initialized to 1.0 and the biases b are initialized to 0.0. When the training is done, the user is asked if he or she would like to retrain by randomizing the weights w. When satisfactory results have been attained, the program saves the neural network information to a file with the extension ann.

To activate the output mode, the user runs the neural executable using the following arguments:

neural–o<name of ann><data file> where the first line of the data file contains the number of data points present in the file, followed by a list of input values. The predicted outputs are then saved to file with an extension out.

Neural 1.0 was found to be a very reliable and efficient tool for training and testing feed forward neural networks. The training speed is directly related to the number of neurons, and the number of training data points that are used. For medium sized architectures (5–10 neurons), the Levenberg-Marqurdt program is very efficient. For some complicated neural networks, the network may need to be retrained several times in order to arrive at an acceptable solution.

Network Modeling

Figure 17:
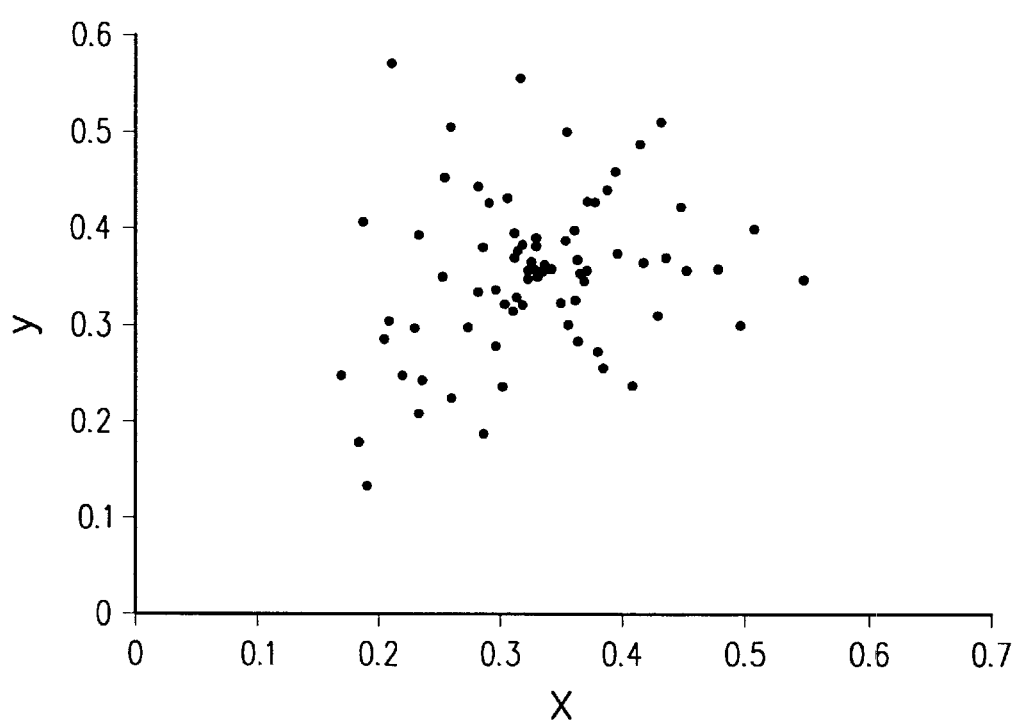
FIG. 17 shows a full factorial (3×3×3) data set in xy chromaticity coordinates

A first step of a network modeling process is to select a set of training data points. One can go about performing a full factorial experiment by printing every combination of the CMYK colors, and then measuring these printed color patches. The logical question is how many data points are needed to train an accurate neural network, such as 33 of FIG. 21. The number of data points depends on many factors, including the accuracy of color rendition required, the uniformity of spacing of the samples in terms of color, and any non-linear characteristics of the specific color printer. At least five levels of CMYK are needed to capture the non-linearity of a four color CMYK printing process. It is evident that the number of color patch measurements becomes very large and impractical if a dense grid is selected. Generally, for higher levels of black (K), the number of samples may be considerably reduced, since the color difference between samples will be very small. Instead of using a full factorial data set, such as is shown in FIG. 17, a designer can reduce the total number of samples by investigating how color varies in different regions of the printer's gamut. Using the Naugebauer model as a guide, it is evident that color changes quite linearly on the periphery of the gamut. The behavior becomes non-linear as we move toward the center of the gamut's color space, the center corresponding to colors that are mixed with some percentage of black or white. With this in mind, the number of data points can be reduced in the linear peripheral regions of the gamut, and increased in the center where non-linearity is present. The ANSI IT8.7/3 standard of FIG. 16 provides a basic and extended input data set, consisting of 182 samples and 746 samples, respectively, for characterizing any four color process. The designers of this ANSI basic data set have chosen the data points in order to capture the general behavior of any printer by using only 182 samples.

FIGS. 17 and 16, respectively, show the sample distribution for a (3×3×3×3) full factorial set, and a 182 sample IT8 basic data set in xy chromaticity coordinates. From FIGS. 16 and 17 it is seen that the IT8 of FIG. 16 uses a small percentage of the total number of points in the outer region where color varies in a linear fashion, and emphasizes the interior regions where black is introduced.

An embodiment of this invention uses the 182 sample basic data set of FIG. 16 as the primary training material due to its intelligent sample distribution and its small sample size. Thirty additional samples, not included in the training data set, were also measured to be used as a real time testing set. In addition, the full factorial (6×6×6×6) data set of FIG. 17 was generated for testing the accuracy and prediction ability of the neural network. All color patches were printed on an IBM Network color printer, and all measurements were made using a Photo Research PR650 spectroradiometer by measuring each patch six times and averaging the results. All measurements were made in accordance to the IT8 spectral measurements standard. Due to the number of color samples, measurements were not repeated to measure effects of printer drift, page to page variation, or any error of the measuring device.

FIG. 18 shows the neural network architecture of the present invention for modeling a four color CMYK printer having four inputs corresponding, respectively, to the CMYK colors, having one 5-neuron hidden layer, and having one output. FIG. 18 corresponds to network 33 of FIG. 21.

FIG. 19 is a ΔE error histogram for the neural network of FIG. 18. From FIG. 19 it is clear that accuracy of the neural network decreases in the 40–60% K regions due to a non-linearity that is introduced by black ink. At higher levels of black, the error is reduced, since the black ink dominates, and any CMY combination still looks very dark. The results can be improved if the number of training data points is increased in the problematic regions, or if the training data points are redistributed. The 5 neuron network of FIG. 18 does an excellent job at mapping colors that contain no black ink, with an average ΔE on conductor 40 of FIG. 21 of 3.961. This is very impressive mapping, keeping in mind that only 182 data points were used for training neural network 33 of FIG. 21, shown in greater detail in FIG. 18.

It is not clear if the 5 neuron network architecture of FIG. 18 is the best choice for performing color space conversion for any printer, or for any instance of the same printer. While the exact number of neurons for each case may be variable in accordance with this invention, it is safe to assume that neural networks with more than 8 neurons will overfit the patch data and should not be considered. Thus, an acceptable neuron range in accordance with this invention is from 5 to 7 neurons.

Advantages of the FIG. 18 neural network to performing color space conversion over any other methodology are: The neural network of FIG. 18 captures the non-linear behavior of the CMYK to LAB color space conversion; The neural network of FIG. 18 demonstrates excellent generalization and predictive abilities; Only a relatively small number of well chosen training data points or color patches are required; Neural network functions are well defined and can perform a forward pass very quickly.

In addition to the above described use of 182 data points, an alternative set of 101 data points can be used to train neural network 33 of FIG. 21. This reduces the total number of color patch measurements that are required, while at the same time maintaining reasonable accuracy for the FIG. 21 system whose output 37 operates to build the printer's profile lookup table. The 182 data points were reduced to 150 or to 101 data points by removing redundant points in the linear regions of the printer gamut, and by adding data points only where non-linearities were present in the printer gamut, typically where black is mixed with the other primary colors CMY, and RGB as obtained by pair wise combinations of CMY.

As shown by the above-detailed description, this invention provides a neural network-based color space conversion apparatus/technique of FIGS. 20 and 21 that is a very accurate alternative to prior interpolation schemes. In addition, the total number of color patches that are required is a relatively small number, such as 182, 150, or 101, thus allowing for quick printer re-characterization. In addition, a one step gamut mapping and gray component replacement methodology is provided, using constrained optimization routine/network 39 of FIG. 21, this one step methodology providing a very accurate and versatile approach to providing a CMS.

As stated above, in one embodiment of this invention, a lookup table is constructed for later use by the related color printer. With reference to FIG. 27, and without limitation thereto, one computer system example of the utility of such a color printer profile lookup table 45 in accordance with this embodiment of the invention is shown. It is important to note that table 45 was built in accordance with the operation of FIG. 21.

In the construction and arrangement of FIG. 27, a CMS comprises the two sections 46 and 47, and an electronic color image that is to be printed by the CMYK color printer is represented at 48. As is well known, image 48 comprises a row/column arrangement of many image pixels wherein each individual pixel contains a RGB device-dependent color value that indicates the color of that pixel. It is to be noted that in other examples like FIG. 27, image 48 may comprise LAB, or CMYK color values for each pixel.

As a pixel 53 of image 48 is to be printed, that pixel's device-dependent RGB color value is provided as an output 49 to CMS section 46. If image 48 was to be displayed on a color monitor, then color monitor profile lookup table 50 would be used to find an in-gamut RGB value for presentation to the color monitor. However, in this case, since image 48 is to be printed by a CMYK printer, it is important to note that CMS section 46 provides a device-independent LAB signal 51 to CMS section 47.

The binary value as encoded within an image file format (such as the TIF format) of LAB signal 51 is now used to calculate a corresponding device-dependent binary CMYK color value, again in an image file format, in accordance with the binary CMYK output 37 of FIG. 21. This corresponding CMYK color value is now presented to output 52 of FIG. 27. Output 27 then operates to control the CMYK printer to reproduce pixel 53 of image 48. This process can be carried out on a uniform grid of LAB values to generate on ICC profile lookup table for the CMYK printer.

In an embodiment of the invention, each entry within color printer profile lookup table 45 of FIG. 27 comprises a unique printer independent LAB value and its corresponding printer dependent and in-gamut CMYK value. As is well known, the L component of a LAB value may vary in the range 0 to 100, the A component of a LAB value is expected to vary in the range −128 to +128, and the B component of a LAB value is expected to vary in the range −128 to +128. In selecting LAB values to be submitted to input 34 of FIG. 21, an embodiment of the invention divided each of these three component ranges into its own equal increment set of values, and then presented a set of LAB values to input 34 that comprised all possible combinations of the these incremental values of L, A and B. When in FIG. 27 a LAB value 51 is presented to lookup table 45 for which there is not an identical LAB value table entry, then, as is known, interpolation techniques are applied to lookup table 45 to thereby generate an interpolated CMYK value 52 for use in controlling the CMYK color printer for that particular image pixel.

Figure 30:
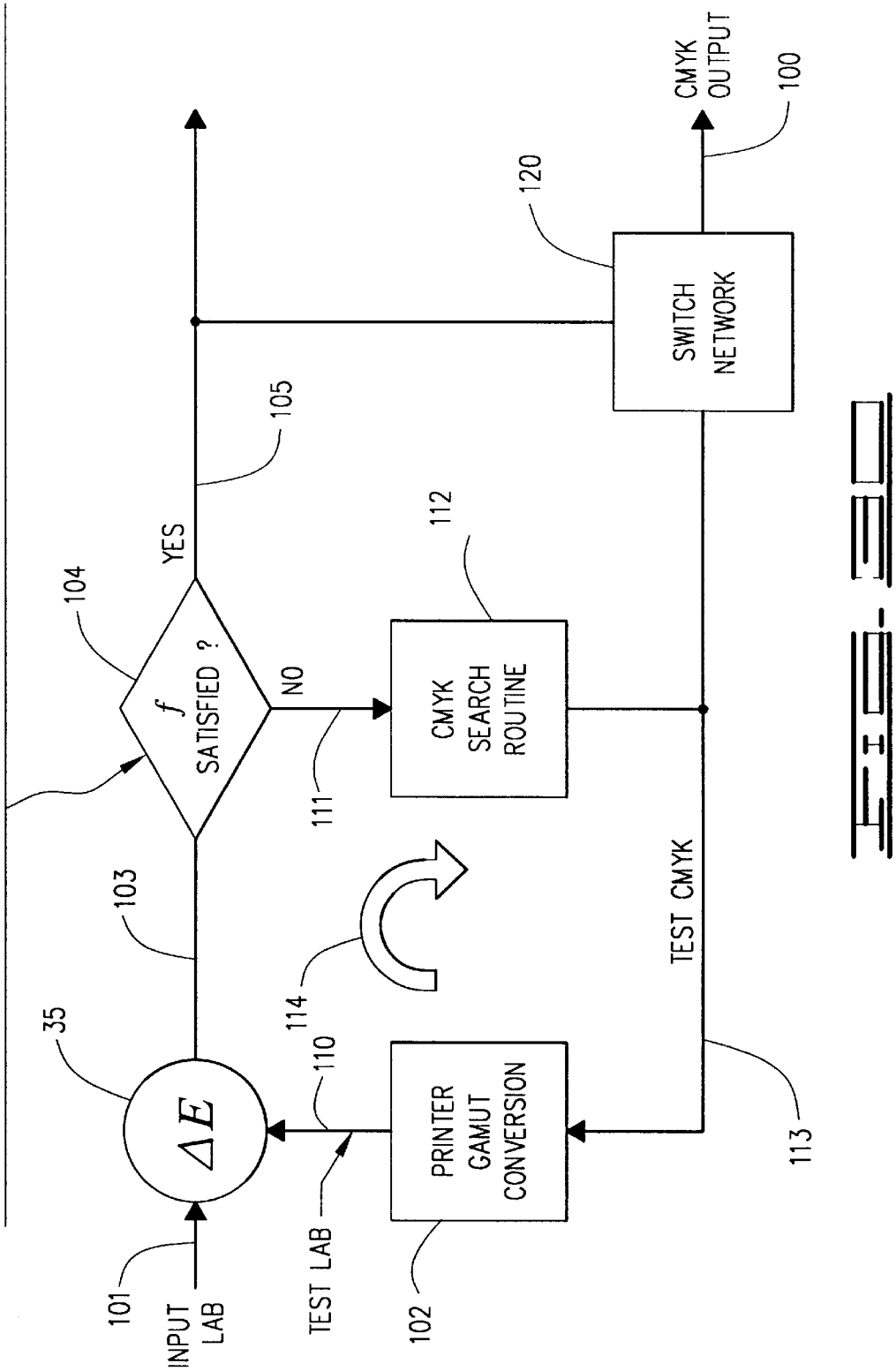
FIG. 30 shows another embodiment of the invention wherein a CMYK output value is determined as a function f of a predefined and acceptable LAB color error and a predefined and acceptable ink parameter, such as the CMYK ink cost and/or ink quantity, wherein function f is minimized by operation of the invention.

FIG. 30 provides a showing of another embodiment of the invention wherein a CMYK output value 100 is determined as a function of (1) a predefined and an acceptable LAB color error 103, and (2) a predefined and acceptable ink parameter, such as the ink cost of CMYK output value 100, and/or the ink quantity of CMYK output value 100.

In the embodiment of FIG. 30, the general optimization formulation of FIG. 21 allows a user to control the FIG. 30 process by selecting the values that are within an optimization formula "f=C1(color error)+C2(CMYK ink parameter)" that is implemented by decision function 104. In this formula, the two terms C1 and C2 are constants in the range 0 to 1, the term "color error" comprises a predefined and acceptable magnitude of error output 103 from junction 35, and the term "CMYK ink parameter" comprises a term that controls an ink parameter, such as the total quantity of ink within a CMYK pixel value at output 100, or the total ink cost that is within a CMYK pixel value output 100.

An example of a specific optimization formula that is used in function 104 of FIG. 30 might be "f=C1(error 103)+C2 (total ink quantity in CMYK output value 100)", where network 104 operates to provide its YES output 105 when the function f goes to zero or when function f is minimized, this being subject to the constraints that (1) the "error 103" term cannot be greater than a maximum tolerable visual color error, (2) the "total ink quantity in CMYK output value 100" term cannot be greater than a maximum tolerable total ink quantity for a CMYK color pixel, and (3) the terms "C1" and "C2" can vary between 0 and 1.

In order to minimize the function f subject to no constraints relative to the "CMYK ink parameter" term, C1 is set to 1, and C2 is set to 0. The result is that output CMYK color 100 is exactly the same as defined by an in-printer gamut input LAB value 101, or output CMYK color 100 is a color that is very close to input LAB 101 when the input LAB value 101 is out of printer gamut.

In order to minimize the "CMYK ink parameter" term, C1 is set to 0 and C2 is set to 1. However, as a practical matter (since white paper with no image uses the least ink), C1 should be set to produce a CMYK color output 100 whose color is acceptable to the viewer, and values higher than about 4 for error 103 are not recommended.

Figure 29:
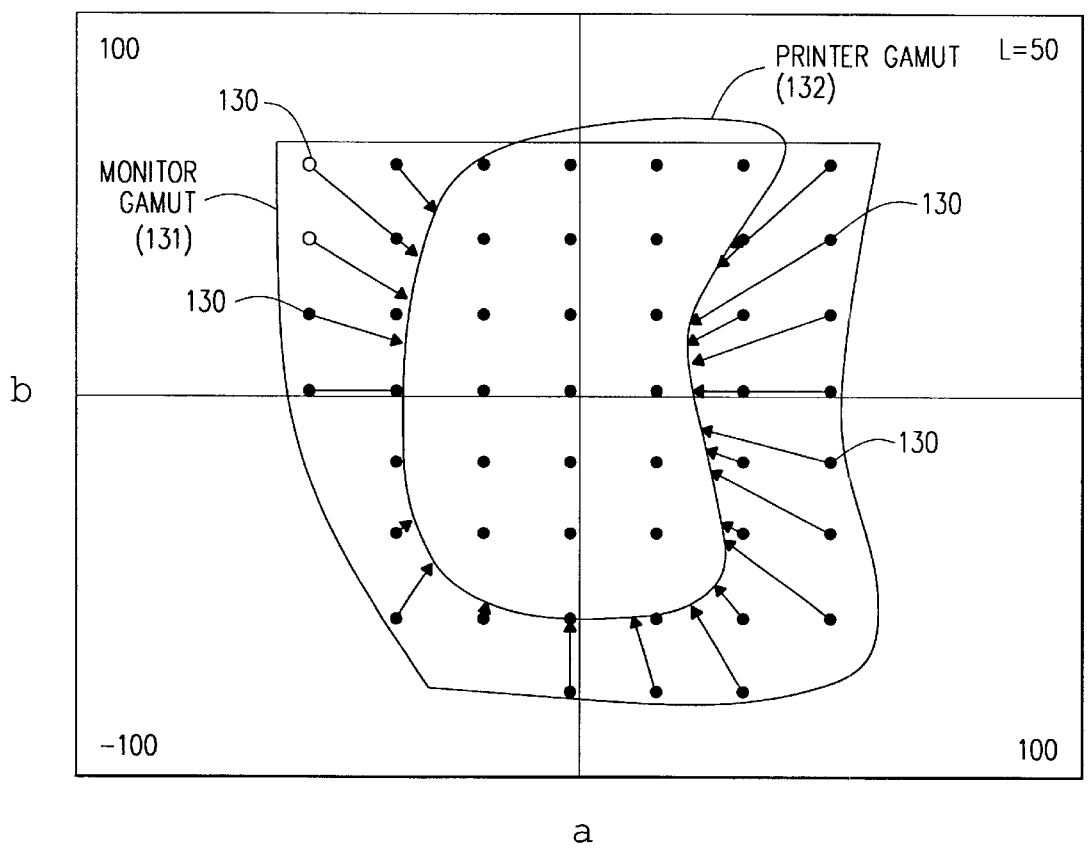
FIG. 29 is helpful in visualizing how the LAB color values that are associated with the relatively larger gamut of a RBG color monitor are mapped into a relatively smaller gamut that is associated with a CMYK color printer.

FIG. 29 is helpful in visualizing how the RBG color values 130 that are associated with the relatively larger gamut 131 of a RBG color monitor are mapped into a relatively smaller gamut 132 that is associated with a CMYK color printer.

In the operation of FIG. 30, an input LAB value 101 that defines an image pixel that is to be printed, or an input LAB value 101 that defines a LAB entry for lookup table 45 of FIG. 27, is first presented to input 101. The printer gamut is contained within printer gamut conversion network 102, and a test CMYK value 113 is presented to the input of printer gamut conversion network 102. Network 102 now operates to provide a test LAB value on its output 110 in accordance with (1) the printer's gamut, and (2) test CMYK value 113.

Junction 35 now operates to compare input LAB 101 to test LAB 110, and a color error 103 is thereby generated. Decision network 104 now operates to determine if color error 103 satisfies, i.e. minimizes, function f.

When function f has not been satisfied, the NO output 111 of decision function 104 operates to control CMYK search routine or network 112 to generate another test CMYK value 113, and the process repeats as shown at 114 until a YES output 105 is later produced by decision function 104.

When YES output 105 is activated, a switch network 120 operates to provide the test CMYK value 113 that resulted in decision network 104 being satisfied to output 100.

If a CMYK printer is being controlled by operation of FIG. 30 to print a color pixel as defined by input LAB 101, then the CMYK output value 100 is used to control the printer to print a color pixel that corresponds to CMYK output value 100.

If lookup table 45 of FIG. 27 is being built by operation of FIG. 30, then input LAB 101 is combined with CMYK output value 100 to form an entry to lookup table 45.

Figure 31:
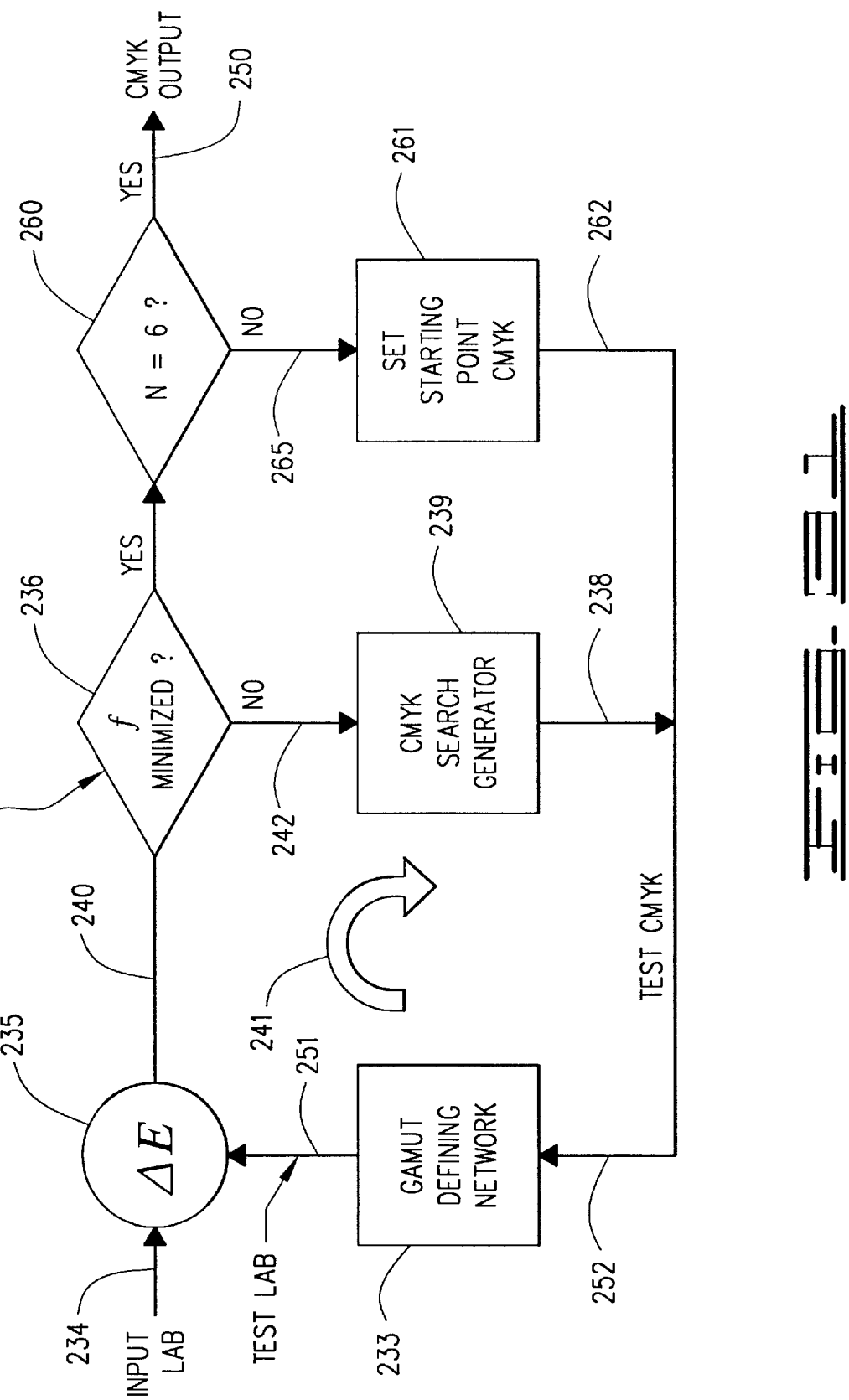
FIG. 31 shows an embodiment of the invention having portions thereof that function to provide the FIG. 21 embodiment, and having other portions that provide for repeating the minimization routine of FIG. 21 a preselected number of times.

FIG. 31 shows another embodiment of the invention. In FIG. 31, an input printer independent LAB signal is provided at 234. Input LAB signal 234 may comprise one of a number of entries that are to be made to a profile lookup table, such as 45 of FIG. 27 by operation of this invention, or input LAB signal 234 may comprise one CMYK color pixel that to be printed by a given CMYK printer in accordance with this invention in response to the printer dependent CMYK output signal 250 of FIG. 31.

As explained above relative to FIG. 21, a test CMYK signal 252 is applied to one input of gamut-defining network 233, preferably a neural network 233, by the output 238 of a CMYK search generator 239. As a result of receiving test CMYK signal 252, gamut determining network 233 operates to generate a test LAB signal 251 in response to (1) the value of test CMYK signal 252, and (2) the gamut of the given CMYK printer.

Error determining junction, or network, 235 now operates to compare input LAB signal 234 to test LAB signal 251, and to produce an error output 240 in response to a difference between these two LAB values 234,251.

Minimizing network 236 operates to minimize the function f=C1(error 240)+C2(C+M+Y+K)−C3(K). In function f, C1, C2 and C3 are user-defined constants that can range from 0 to 1 in value, the term "C+M+Y+K" is the total quantity of ink that is specified by a CMYK output value 250, and the term "K" is the total quantity of black ink that is within the CMYK output value 250.

The above minimizing operation repeats, as indicated at 241, until such time as a given test CMYK value 252 operates to produce a YES output from network 236, thus indicating that for this series 241 minimize operations the given test CMYK value that then exists at 252 can be used as output 250.

A feature of FIG. 31 is that decision network 260 is provided to ensure that a global minimization is achieved. This is done by setting decision network 260 to look for a preselected number of minimization repetitions, for example 6 repetitions. As long as decision network 260 is not satisfied, network 261 is enabled by NO output 265, and network 261 operates to set a new test CMYK signal value at 262. The above-described minimizing operation of function f is then repeated as shown by arrow 241. When this minimization operation 241 has been repeated, for example 6 times, the YES output of decision network 260 enables CMYK output 250 from FIG. 31, this particular CMYK value 250 being the then existing value of test CMYK signal 252.

While the invention has been described with reference to preferred embodiments thereof, it will be understood by those skilled in the art that various other changes in the form and details of this invention may be made without departing from the spirit and scope of the invention. It should be understood that the above detailed description is made by way of example, and that the invention is defined by the scope of the following claims.

What is claimed is:

1. A method of controlling a color printer having a gamut that defines all colors that can be printed by the printer, the printer being connected in a computer system that contains a set of printer independent input signals that command the printer to print an output print that corresponds to the set of input signals, the method comprising the steps of:

using the printer to print a plurality of output prints said plurality of output prints being representative of the gamut of the printer and comprising in the range of from about 101 to about 182 output prints;

providing a neural network comprising in the range of from about 5 to about 7 neurons;

using said plurality of output prints to train said neural network and thereby provide a gamut trained neural network for converting printer dependent color signals into printer independent color signals that correspond to the gamut of the printer;

using said gamut trained neural network to generate a printer profile lookup table tabulating a series of printer independent color signals to a series of printer dependent color signals that correspond to the gamut of the printer;

using said set of printer independent input signals to address said printer profile lookup table; and controlling the printer in accordance with a set of printer dependent color signals that correspond to the set of printer independent input signals.

2. The method of claim 1 wherein said neurons operate to implement a non-linear hyperbolic tangent activation function.

3. The method of claim 1 wherein said device-independent color signals comprise LAB signals and wherein said device-dependent color signals comprise CMYK signals.

4. The method of claim 1 wherein said plurality of output prints representative of the gamut of the printer are selected in accordance with an ANSII basic data set in xy chromaticity coordinates.

5. The method of claim 4 wherein said device-independent color signals comprise LAB signals and wherein said device-dependent color signals comprise CMYK signals.

6. A method for controlling a color printer having a color gamut, said color printer being responsive to a computer system that provides color space image signals that command said color printer to print an output print that corresponds to said color space image signals, the method comprising the steps of:

producing a plurality of output prints from said color printer representative of the color gamut of said color printer and comprising a plurality of different colors selected in accordance with an ANSI print set in xy chromaticity coordinates;

analyzing said plurality of output prints:

providing a neural network;

training said neural network using the results of said analysis step to thereby provide a gamut trained neural network;

using said gamut trained neural network to produce a printer profile lookup table that correlates color space signals to the color gamut of said color printer;

connecting said color space image signals to address said printer profile lookup table; and controlling said color printer in accordance with a portion of the color gamut of said color printer that corresponds to said color space image signals.

7. The method of claim 6 wherein said plurality of output prints comprise in the range of from about 101 to about 182 output prints, and wherein said neural network comprises in the range of from about 5 to about 7 neurons.

8. The method of claim 7 wherein said neurons operate to implement a non-linear hyperbolic tangent activation function.

9. The method of claim 6 wherein said color space image signals are printer independent, and wherein the color gamut of said color printer defines printer dependent signals.

10. The method of claim 6 wherein said neural network operates to implement a non-linear hyperbolic tangent activation function.

11. A method of making a profile lookup table for a CMYK color printer comprising the steps of:

producing a relatively small number of different color prints using the CMYK printer;

using said color prints to train a neural network and thereby define a gamut of the CMYK printer as said gamut is defined by said relatively small number of different color prints, said neural network comprising from about 5 to about 7 neurons; and using said trained neural network to generate a printer profile lookup table that converts LAB values to corresponding CMYK values in accordance with said gamut of the CMYK printer.

12. The method of claim 11 wherein said step of using said color prints to train said neural network includes the step of using an optimization routine to constrain said corresponding CMYK values in accordance with preselected criteria relationship between the C, M, Y and K colors.

13. The method of claim 11 further including, the steps of:

providing LAB input signals that define a color image to be printed by the CMYK printer;

using said LAB signals as an input to said lookup table; and providing CMYK signals from said lookup table to the CMYK printer corresponding to said LAB signals, such that output prints are produced by the CMYK printer as defined by said RGB input signals.

14. Apparatus for producing a profile lookup table for use by a CMYK color printer in producing color prints, the profile lookup table comprising a plurality of table entries wherein each entry comprises a LAB value and a corresponding CMYK value in accordance with a print gamut of the CMYK color printer, the apparatus comprising:

a neural network defining the print gamut of the CMYK color printer;

said neural network having an input for receiving a test CMYK value;

said neural network having an output for generating a LAB value that corresponds to said print gamut and to said test CMYK value;

an error determining network;

said error determining network having a first input connected to receive a series of LAB values wherein each of said received LAB values corresponds to a table entry of the profile lookup table;

said error determining network having a second input connected to said output of said neural network to receive test LAB values;

said error determining network having an error output that is responsive to a difference in the LAB values received by said first and second inputs;

an error testing network establishing a LAB error criteria as a function of C, M, Y and K variables;

said error testing network having an input connected to said error output of said error determining network;

said error testing network having a NO output indicative of failure of said error output of said error determining network to meet said LAB error criteria;

said error testing network having a YES output indicative of said error output of said error determining network meeting said LAB error criteria; and said YES output providing a CMYK value table entry to the profile lookup table that corresponds to a LAB value then connected to said first input of said error determining network.

15. The apparatus of claim 14 including:

an optimization network connected intermediate to said NO output of said error testing network and said input of said neural network;

said optimization network operating to minimize said error output of said error determining network that is responsive to a difference in the LAB values that are received by said first and second inputs of said error determining network.

16. The apparatus claim 15 wherein said neural network includes from 5 to 7 neurons.

17. The apparatus of claim 16 wherein said optimization network operates to apply a preselected constraint on said CMYK value table entries to the profile lookup table.

18. The apparatus of claim 17 wherein said preselected constraint is that the total quantity of printing ink that is represented by each CMYK value table entry shall not exceed a preselected quantity.

19. Apparatus for producing a profile lookup table for use by a color printer in producing color prints, the profile lookup table comprising a plurality of table entries wherein each entry comprises a printer independent color value and a corresponding printer dependent color value in accordance with a print gamut of the color printer, the apparatus comprising:

a neural network defining the print gamut of the color printer;

said neural network having an input for receiving a test printer dependent color value;

said neural network having an output for generating a printer independent color value that corresponds to said print gamut and to said test printer dependent color value;

an error determining network;

said error determining network having a first input connected to receive a series of printer independent color values wherein each of said received printer independent color values corresponds to a table entry of the profile lookup table;

said error determining network having a second input connected to said output of said neural network to receive test printer independent color values therefrom;

said error determining network having an error output that is responsive to a difference in printer independent color values received by said first and second inputs;

an error testing network establishing a color value error criteria;

said error testing network having an input connected to said error output of said error determining network;

said error testing network having a NO output indicative of failure of said error output of said error determining network to meet said color value error criteria;

said error testing network having a YES output indicative of said error output of said error determining network meeting said color value error criteria; and said YES output providing a printer dependent color value table entry to the profile lookup table that corresponds to a printer independent color value then connected to said first input of said error determining network.

20. The apparatus of claim 19 including:

an optimization network connected intermediate said NO output of said error testing network and said input of said neural network;

said optimization network operating to minimize said error output of said error determining network that is responsive to a difference in the printer independent color values that are received by said first and second inputs of said error determining network.

21. The apparatus claim 20 wherein said neural network includes from 5 to 7 neurons.

22. The apparatus of claim 21 wherein said optimization network operates to apply a preselected ink constraint on said printer dependent color value table entries.

23. The apparatus of claim 22 wherein said preselected constraint is that the total quantity of printing ink/specified by each printer dependent color value table entry shall not exceed a preselected quantity of ink.

24. The apparatus of claim 19 wherein said printer dependent color value table entrvy is a CYMK table entry, and wherein said preselected constraint relates to the quantity of K within each CMYK table entry.

25. Apparatus for converting printer independent color signals to printer dependent color signals, comprising:

an input for receiving a printer independent color signal that defines a color pixel image to be printed by a color printer;

a color gamut conversion network having an input for receiving a test printer dependent color signal, and having an output for providing a test printer independent color signal in accordance with a color gamut of the color printer and in accordance with said received test printer dependent color signal;

an error determining junction having a first input connected to said input receiving said printer independent color signal defining a color pixel image to be printed by the color printer, having a second input connected to said output of said color gamut conversion network for receiving said test printer independent color signal, and having an output responsive to a difference between said printer independent color signal defining a color pixel image to be printed by the color printer and said test printer independent color signal;

a decision network constructed and arranged to implement a function f=C1(error signal)+C2(a parameter of a printed color pixel), wherein said terms "C1" and "C2" are constants, wherein said term "error signal" is a function of an acceptable color error of a printed color pixel corresponding to said printer independent color signal, and wherein said term "a parameter of a printed color pixel" relates to a factor, such as the ink cost of a printed color pixel corresponding to said input printer independent signal;

said decision network having an input connected to said output of said error determining junction, having a YES output responding to said function being satisfied, and having a NO output responding to said function not being satisfied;

a generating network for generating a test printer dependent color signal;

said generating network having an input connected to said NO output of said decision network, and said generating network operating to generate said test printer dependent signal on an output of said generating network in response to said function not being satisfied; and circuit means connecting said output of said generating network to said input of said color gamut conversion network.

26. The apparatus of claim 25 wherein said color gamut conversion network comprises a neural network that is trained in accordance with said color gamut of the color printer.

27. The apparatus of claim 25 including:

means responsive to said YES output of said decision network operating to provide said test printer dependent color signal to control the printer as said function of said input printer independent color signal.

28. The apparatus of claim 27 wherein said color gamut conversion network comprises a neural network that is trained in accordance with said color gamut of the color printer.

29. The apparatus of claim 25 wherein so long as said NO output of said decision network continues to persist, said generating network operates to generate a string of individually different test printer dependent signals until such time as a test printer dependent signal is generated that results in said function being satisfied.

30. The apparatus of claim 29 wherein a serial string of said input printer independent color signals are applied to said first input of said error determining junction, and including means responsive to a corresponding string of YES outputs from said decision network operable to build a printer profile lookup table having a string of entries, each individual entry being in accordance with an individual input printer independent color signal and a corresponding individual test printer dependent signals that resulted in said function being satisfied.

31. The apparatus of claim 30 wherein said color gamut conversion network comprises a neural network that is trained in accordance with said color gamut of the color printer.

32. The apparatus of claim 25 wherein said printer independent color signals are LAB signals, wherein said printer dependent color signals are CMYK signals, and wherein the color printer is a CMYK printer.

33. The apparatus of claim 32 wherein said YES output of said decision network is operable to apply a test CMYK signal that resulted in said YES output being produced to control said CMYK printer.

34. The apparatus of claim 33 wherein said color gamut conversion network comprises a neural network that is trained in accordance with said color gamut of the CMYK printer.

35. The apparatus of claim 32 wherein said YES output of said decision network is operable to apply an entry to a profile lookup table of said CMYK printer, said entry comprising a test CMYK signal that resulted in said YES output and said input LAB signal.

36. The apparatus of claim 35 wherein said color gamut conversion network comprises a neural network that is trained in accordance with said color gamut of the CMYK printer.

37. A method for converting an input color signal to an output color signal that correspond to the color gamut of a color printer, comprising the steps of:

receiving said input color signal;

providing color gamut conversion means for generating a test color signal for comparison to said input color signal, said test color signal being in accordance with said color gamut of said color printer;

providing error determining means for determining an error magnitude of a difference between said input color signal and said test color signal;

providing decision means responsive to said error magnitude, said decision means operating to determine an acceptable error or an unacceptable error;

providing first means responsive to said unacceptable error for controlling said color gamut conversion means to generate a different test color signal for comparison to said input color signal;

repeating operation of said first means until a given test color signal results in an acceptable error being determined by said decision means; and providing second means responsive to said acceptable error for generating said output color signal in accordance with said given test color signal.

38. The method of claim 37 wherein said output color signal is operable to produce a printed pixel.

39. The method of claim 37 wherein said output color signal is applied as an entry to a color printer profile lookup table.

40. The method of claim 37 wherein said output color signal defines a color pixel to be printed by a color printer, and wherein said decision means implements the function;

acceptable error=C1(actual error)+C2(cost of said color pixel), wherein said terms "C1" and "C2" are constants, wherein said term "actual error" is a function of an acceptable visual color error of said color pixel, and wherein said term "cost of said color pixel" relates to the ink cost of said color pixel.

41. The method of claim 40 wherein said color gamut conversion means comprises a neural network that is trained in accordance with a plurality of color prints that define said color gamut.

42. The method of claim 40 wherein said input color signal is a LAB signal, wherein said test color signal is a LAB signal, wherein said output color signal is a CMYK signal, and wherein said color printer is a CMYK printer.

43. The method of claim 42 wherein said color gamut conversion means comprises a neural network that is trained in accordance with a plurality of CMYK color prints that define said color gamut.

44. The method of claim 37 including the steps of:

generating a string of input color signals and then, by operation of the method of claim 37, generating a corresponding string of output color signals for which acceptable errors have been determined; and generating a profile lookup table for said color printer in accordance with said string of input color signals and said corresponding string of output color signals.

45. The method of claim 44 wherein said input color signals are LAB signals, wherein said test color signals are LAB signals, wherein said output color signals are CMYK signals, wherein said profile lookup table comprises a string of table entries, each table entry of which relates an individual LAB signal to a corresponding individual CMYK signal, and wherein said color printer is a CMYK printer.

46. The method of claim 45 wherein said color gamut conversion means comprises a neural network that is trained in accordance with a plurality of CMYK color prints that define said color gamut.

47. Apparatus for constructing a profile lookup table for use by a given CMYK printer in printing a CMYK color print in response to a plurality of printer independent color signals that define the CMYK color print, the profile lookup table containing a plurality of individual entries, each entry containing a printer independent signal and a corresponding CMYK signal in accordance with a gamut of the given CMYK printer, the profile lookup table for use in converting printer independent signals to CMYK signals in accordance with the gamut of the given CMYK printer, said apparatus comprising:

a neural network having an input and an output;

said neural network being responsive to a CMYK signal at said input and operating to provide a printer independent signal at said output in accordance with the gamut of the given CMYK printer;

apparatus input means for receiving a plurality of input printer independent signals, each individual one of said input printer independent signals corresponding to an individual entry in the profile lookup table;

error measuring means having a first input connected to receive an individual one of said plurality of input printer independent signals, having a second input connected to said output of said neural network, and having a difference error output that is responsive to a difference between signals applied to said first and second inputs;

error criteria means having an input connected to said difference error output of said error measuring means, said error criteria means operating to set CMYK optimization criteria to be met by all CMYK entries to the profile lookup table;

said error criteria means providing a NO output so long as said difference between signals applied to said first and second inputs of said error measuring means does not satisfy said CMYK optimization criteria;

said error criteria means providing a YES output when said difference between signals applied to said first and second inputs of said error measuring means satisfies said CMYK optimization criteria;

first means responsive to said NO output operating to sequentially apply a different CMYK signal to said input of said neural network until such time as a given CMYK signal applied to said input of said neural network operates to provide said YES output from said error criteria means; and second means responsive to said YES output for producing an entry in the profile lookup table that comprises said individual one of said input printer independent signal and said given CMYK signal.

48. The apparatus of claim 47 wherein said CMYK optimization criteria includes a total ink quantity and/or a total black ink quantity represented by said given CMYK signal.

49. The apparatus of claim 48 wherein said printer independent signals are LAB signals.

50. Apparatus for controlling a given CMYK printer to print a CMYK color print in response to a plurality of printer independent color signals that define a plurality of color pixels within the CMYK color print, said CMYK printer having a CMYK color gamut, said apparatus comprising:

gamut-defining means having an input and an output;

said gamut-defining means being responsive to a CMYK signal at said input and operating to provide a printer independent signal at said output in accordance with the CMYK gamut of the given CMYK printer;

apparatus input means for receiving the plurality of input printer independent signals that define a plurality of pixels within the CMYK color print, each individual one of said input printer independent signals corresponding to an individual pixel of the pixels within the CMYK color print;

error measuring means having a first input connected to receive each individual one of said plurality of input printer independent signals, having a second input connected to said output of said gamut-defining means, and having a difference error output that is responsive to a difference between signals applied to said first and second inputs;

error criteria means having an input connected to said difference error output of said error measuring means, said error criteria means operating to set CMYK optimization criteria to be met by all color pixels of the CMYK color print;

said error criteria means providing a NO output so long as said difference between signals applied to said first and second inputs of said error measuring means does not satisfy said CMYK optimization criteria;

said error criteria means providing a YES output when said difference between signals applied to said first and second inputs of said error measuring means satisfies said CMYK optimization criteria;

first means responsive to said NO output operating to sequentially apply a different CMYK signal to said input of said gamut-defining means, until such time as a given CMYK signal applied to said input of said gamut-defining means operates to provide said YES output from said error criteria means; and second means responsive to said YES output for providing said given CMYK signal to control the given printer.

51. The apparatus of claim 50 wherein said CMYK optimization criteria includes a total ink quantity and/or a total black ink quantity represented by said given CMYK signal.

52. The apparatus of claim 51 wherein said printer independent signals are LAB signals.

53. The apparatus of claim 52 wherein said gamut defining means is a neural network.

* * * * *